US009985772B1

(12) United States Patent
Johnson et al.

(10) Patent No.: US 9,985,772 B1
(45) Date of Patent: May 29, 2018

(54) DIGITAL SIMULTANEOUS TRANSMIT AND RECEIVE COMMUNICATION SYSTEM

(71) Applicant: The Charles Stark Draper Laboratory, Inc., Cambridge, MA (US)

(72) Inventors: Wolf Johnson, Framingham, MA (US); Matthew C. Muresan, Somerville, MA (US); Robert D. Tingley, Charlestown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 270 days.

(21) Appl. No.: 14/988,101

(22) Filed: Jan. 5, 2016

Related U.S. Application Data

(60) Provisional application No. 62/110,095, filed on Jan. 30, 2015.

(51) Int. Cl.
    *H04B 7/00* (2006.01)
    *H04L 5/14* (2006.01)

(52) U.S. Cl.
    CPC ..................... *H04L 5/14* (2013.01)

(58) Field of Classification Search
    None
    See application file for complete search history.

(56) References Cited

U.S. PATENT DOCUMENTS

| 7,202,812 B2 | 4/2007 | Krikorian et al. ............ 342/198 |
| 8,854,188 B2 | 10/2014 | Stewart ........................ 340/10.1 |
| 2012/0269102 A1 | 10/2012 | Nicholls et al. .............. 370/278 |
| 2012/0282872 A1* | 11/2012 | Banwell .................... H04B 1/58 455/269 |
| 2013/0155913 A1* | 6/2013 | Sarca ....................... H04B 1/40 370/277 |
| 2013/0266092 A1* | 10/2013 | Sugar ..................... H04B 1/005 375/340 |
| 2014/0128008 A1 | 5/2014 | Cox et al. ...................... 455/78 |
| 2014/0348018 A1 | 11/2014 | Bharadia et al. ............ 370/252 |
| 2014/0349595 A1* | 11/2014 | Cox ..................... H04B 1/0458 455/78 |

OTHER PUBLICATIONS

Basheer, et al., "Active Self Interference Cancellation Techniques in Full Duplex Communication Systems—A Survey," International Journal of Research in Engineering and Technology, vol. 03, Special Issue: 01, pp. 92-96, Mar. 2014.

Basu, et al., Effect of Overhearing Transmissions on Energy Efficiency in Dense Sensor Networks, IPSN'04, 9 pages, Apr. 26-27, 2004.

(Continued)

*Primary Examiner* — Noel R Beharry
*Assistant Examiner* — Lionel Preval
(74) *Attorney, Agent, or Firm* — Sunstein Kann Murohy & Timbers LLP

(57) ABSTRACT

In a simultaneous transmit and receive (STAR) communication system, an RF signal splitter couples an antenna to an RF transmitter and to an RF receiver, without using a circulator. An adaptive cancellation RF waveform generator generates an adaptive cancellation RF signal to cancel cross-talk from the RF transmitter to the RF receiver. Training signals are used to characterize signal paths within the STAR system and calculate filter coefficients for generating the adaptive cancellation signal.

19 Claims, 14 Drawing Sheets

(56) References Cited

OTHER PUBLICATIONS

Bharadia, et al., "Full Duplex Radios," SIGCOMM'13, 12 pages, Aug. 12-16, 2013.
Bharadia, et al., "Full-duplex," Stanford Networked Systems Group, SIGCOMM, 5 pages, 2013.
Bitline System Pty. Ltd. "Fiber Optic 3-Port Add/Drop Device—Full CWDM Wavelength," http://www.oemarket.com/catalog/product_info.php/fiber-optic-port-adddrop-device-full-cwdm-waverigth-p-68, 3 pages, 2015.
Buxa, "Signal Processing Techniques for Simultaneous Transmit and Receive (STAR)," The Dayton Area Graduate Studies Institute, 2 pages, 2013.
Correal, et al., "A DSP-Based DS-CDMA Multiuser Receiver Employing Partial Parallel Interference Cancellation," IEEE Journal on Selected Areas in Communication, vol. 17, No. 4, pp. 613-630, Apr. 1999.
Cox, et al., "Maximizing RF Spectrum Utilization with Simultaneous Transmit and Receive," Microwave Journal, 8 pages, Sep. 15, 2014.
Frenzel, "GSM Gets A Life From Single-Antenna Interference Cancellation Software," Electronic Design, http://electronicdesign.com/dsps/gsm-gets-lift-single-antenna-interference-cancellation-software, 1 page, Jul. 19, 2004.
Khandani, "Two-Way (True Full-duplex) Wireless," Electrical and Computer Engineering Department, University of Waterloo, Waterloo, ON, Canada, 6 pages, CWIT 2013.
Khojastepour et al., "The Case for Antenna Cancellation for Scalable Full-Duplex Wireless Communications," HotNets-X Proceedings of the 10th ACM Workshop on Hot Topics in Networks, Article No. 17, 6 pages, 2011.
Krier, et al., "Active Self-Interference Cancellation of Passband Signals Using Gradient Descent," IEEE $24^{th}$ International Symposium on Personal, Indoor and Mobile Radio Communications: Fundamentals and PHY Track, 5 pages, 2013.
Naval Electronics, Inc., "Testing Splitters, Taps & Directional Couplers," http://www.naval.com/sp-to-test/, 4 pages, Jan. 27, 2015.
Nova Microwave, "Understanding Circulators and Isolators," http://www.novamicro.com/understanding-circulator-and-isolaters.php, 6 pages, 2014.
Pentek, Inc., Model 78620 Data Sheet, 4 pages, Jan. 30, 2013.
Ramésh, et al., "Single Antenna Interference Cancellation for 8PSK Signals in EGPRS," Vehicular Technology Conference, IEEE $69^{th}$, 5 pages, Apr. 26-29, 2009.
Wikipedia "Adaptive filter," http://en.wikipedia.org/wiki/Adaptive_filter, 8 pages, Sep. 1, 2014.
Wikipedia, "Power dividers and directional couplers," https://en.wikipedia.org/wiki/Power_dividers_and_directional_couplers, 16 pages, Jan. 5, 2015.

\* cited by examiner

DIGITAL SIMULTANEOUS TRANSMIT AND RECEIVE COMMUNICATION SYSTEM

CROSS REFERENCE TO RELATED APPLICATIONS

This application claims the benefit of U.S. Provisional Patent Application No. 62/110,095, filed Jan. 30, 2015, titled "Digital Simultaneous Transmit and Receive Communication System," the entire contents of which are hereby incorporated by reference herein, for all purposes.

TECHNICAL FIELD

The present invention relates to simultaneous transmit and receive (STAR) radio-frequency (RF) communication systems and, more particularly, to circuits for cancelling unwanted signals, such as reflected transmitter signals, that may otherwise interfere with receivers in such systems.

BACKGROUND ART

Simultaneous transmit and receive (STAR) communication systems transmit radio-frequency (RF) (including microwave) signals at the same time, or nearly the same time, they receive RF signals. The transmitted signals are of the same frequency, or within a relatively narrow frequency band, as the received signals. In some cases, such as in a frequency-hopping system, the transmit and receive frequencies may be harmonically related. A STAR system includes a local transmitter and a local receiver. The STAR system may utilize separate transmit and receive antennas, or a single antenna may be utilized for both transmitting and receiving. A STAR system may communicate with a distant communication system having its own transmitter and receiver, or signals from the STAR system may be transmitted so as to be reflected by a distant object back to the STAR system, such as in a radar system.

Absent special circuits, signals from the local transmitter can overwhelm wanted signals from the distant transmitter or the radar signals reflected by the distant object. If separate transmit and receive antennas are used, signals radiated by the transmit antenna may be directly received, i.e., not via a reflection from another object, by the receive antenna and fed to the local receiver. Similarly, signals radiated by the transmit antenna may be reflected ("backscattered") by other antenna elements, mounting hardware or other nearby objects (such as terrain, trees, etc.), other than the object being tracked by radar, and received by the receive antenna and fed to the local receiver. If one antenna is used for both transmitting and receiving, transmitter signals may be reflected by the antenna back down a transmission line, or by other components along the transmission line, to the receiver. Whether or not separate transmit and receive antennas are used, transmitter signals may also undesirably couple into receiver circuits, such as via parasitic capacitances.

Some systems, such as some radar systems, transmit closely spaced-in-time chirps and turn off their receivers during the transmissions. Even in such a system, transmitter signals reflected close to the system may arrive at the receiver while the receiver is on.

Unwanted signals from the local transmitter are referred to as self-interference. Self-interference is typically many dB stronger than wanted received signals. Consequently, self-interference signals can desensitize the local receiver and/or mask the wanted received signals and, therefore, need to be attenuated or completely suppressed.

If one antenna is used for both transmitting and receiving, a circulator is conventionally used as a duplexer to isolate the local receiver from the local transmitter. A circulator is a passive non-reciprocal three- or four-port device, in which a radio frequency signal entering any port is transmitted only, or largely, to the next port in rotation. A typical circulator includes a magnetically biased ferrite disk with three ports coupled to it, creating a Y-junction.

A signal applied to the ferrite disk generates two equal, circularly polarized, counter-rotating waves that rotate at velocities ω+ and ω−. The velocity of a circularly polarized wave as it propagates through the magnetically biased ferrite material depends on its direction of rotation. By selecting a ferrite material and the biasing magnetic field, the phase velocity of the wave traveling in one direction can be made greater than the phase velocity of the wave traveling in the opposite direction.

If a signal is applied at the first port, the two waves arrive in phase at the second port, but they arrive out of phase and destructively interfere with each other at the third port. Maximum power transfer occurs, therefore, from the first port to the second port, and minimum power transfer occurs from the first port to the third port, depending on the direction of the applied magnetic field. Due to the symmetry of the Y-junction, similar results can be obtained for other port combinations. Externally, the circulator appears to direct signal flow clockwise or counterclockwise, depending on the polarization of the magnetic biasing field.

However, because circulators rely on distances between ports being related to wavelength, circulators have narrow bandwidths. Furthermore, although circulators can largely isolate a receiver port from a transmitter port, they do not isolate the receiver port from unwanted signals received via an antenna port. For example, transmitter signals reflected by an antenna or by portions of a transmission line are passed by the circulator to the receiver, as though they were wanted signals. Similarly, transmitter signals reflected by other antennas, mounting hardware and other nearby objects and received by the antenna are passed by the circulator to the receiver, as though they were wanted signals. In addition, ferrite circulators are characterized by relatively high insertion loss and, in some cases being nonlinear devices, they can generate undesirable harmonics.

SUMMARY OF EMBODIMENTS

An embodiment of the present invention provides an adaptive, simultaneous transmit and receive (STAR) radio-frequency (RF) communication system. The system includes an RF signal splitter. The RF splitter includes an input port, a first output port and a second output port. The input port is coupleable to an antenna. The system includes an RF waveform generator. The RF waveform generator includes an output port coupled to the first output port of the RF splitter. The system includes an RF signal combiner. The RF signal combiner includes a first input port, a second input port and an output port. The first input port is coupled to the second output port of the RF signal splitter. The system includes an RF receiver. The RF receiver includes an input port and an output port. The input port is coupled to the output port of the RF signal combiner. The output port provides a signal representative of a signal present at the input port.

The system also includes an adaptive cancellation RF waveform generator. The adaptive cancellation RF waveform generator includes a filter, an adaptive filter coefficient calculator, a first signal input port, a second signal input port and a signal output port. The output port of the adaptive cancellation RF waveform generator is coupled to the second input port of the RF signal combiner. The first signal input port is coupled to the output port of the RF receiver to receive the signal representative of the signal present at the input port of the RF receiver. The second signal input port is coupled to the RF waveform generator to receive a signal from the RF waveform generator representative of a signal the RF waveform generator sends via the output port of the RF waveform generator.

The filter is coupled between the second signal input port and the signal output port. The filter generates an adaptive cancellation signal derived from the signal from the RF waveform generator. The adaptive cancellation signal is generated based on filter coefficients. The filter sends the adaptive cancellation signal via the signal output port.

The adaptive cancellation RF waveform generator repeatedly calculates the filter coefficients, based on the signal from the RF receiver, such that the adaptive cancellation signal attenuates an unwanted signal, without use of a circulator.

The RF waveform generator may send a first training signal. The first training signal may be sent via the output port of the RF waveform generator. The first training signal may be sent while the adaptive cancellation RF waveform generator sends no signal via the output port of the adaptive cancellation RF waveform generator. The adaptive cancellation RF waveform generator may store information about the signal from the RF receiver as a result of the RF receiver receiving the first training signal. The adaptive cancellation RF waveform generator may send a second training signal, substantially identical to the first training signal, via the output port of the adaptive cancellation RF waveform generator, while the RF waveform generator sends no signal via the output port of the RF waveform generator. The adaptive cancellation RF waveform generator may calculate at least some of the filter coefficients based on the stored information and the signal from the RF receiver as a result of the RF receiver receiving the second training signal.

The system may also include a training signal generator, distinct from the filter. The training signal generator may be coupled via a switch to the output port of the adaptive cancellation RF waveform generator.

The adaptive cancellation RF waveform generator may use use pass-through filter coefficients to generate the second training signal from a signal from the RF waveform generator.

The system may further include a switch coupled to the filter to selectively bypass the filter to generate the second training signal.

The RF receiver may include an analog-to-digital converter (ADC). The ADC may include a sample-and-hold circuit coupled to the input port of the RF receiver to sample a signal present at the input port of the RF receiver. The adaptive cancellation RF waveform generator may repeatedly control timing of sending the adaptive cancellation signal via the signal output port of the adaptive cancellation RF waveform generator, such that the adaptive cancellation signal arrives at the ADC while the sample-and-hold circuit samples the signal present at the input port of the RF receiver.

The RF waveform generator may include a digital waveform generator coupled to a first digital-to-analog converter (DAC). The adaptive cancellation RF waveform generator may include a second DAC coupled between the filter and the signal output port of the adaptive cancellation RF waveform generator.

The system may further include an antenna coupled to the input port of the RF signal splitter.

The system may include a local oscillator, a first frequency up-converter, a second frequency up-converter and a frequency down-converter. The first frequency up-converter may be driven by the local oscillator. The first frequency up-converter may be coupled between the output port of the RF waveform generator and the first output port of the RF splitter. The second frequency up-converter may be driven by the local oscillator. The second frequency up-converter may be coupled between the signal output port of the adaptive cancellation RF waveform generator and the second input port of the RF signal combiner. The frequency down-converter may be driven by the local oscillator. The frequency down-converter may be coupled between the output port of the RF signal combiner and the input port of the RF receiver.

Another embodiment of the present invention provides a method for adaptively, simultaneously transmitting and receiving radio-frequency (RF) communications. The method includes generating an RF signal by an RF waveform generator and providing the RF signal to a first output port of an RF signal splitter. A signal is provided from a second output port of the RF signal splitter to a first input port of an RF signal combiner. A signal from an output port of the RF signal combiner is provided to an input port of an RF receiver. At an adaptive cancellation RF waveform generator, a signal is received from the RF receiver. The received signal is representative of a signal present at the input port of the RF receiver. At the adaptive cancellation RF waveform generator, a signal is received from the RF waveform generator. The received signal is representative of the RF signal provided to the first output port of the RF signal splitter. At the adaptive cancellation RF waveform generator, an adaptive cancellation signal is generated. The generated adaptive cancellation signal is derived from the signal from the RF waveform generator. Generation of the adaptive cancellation signal is based on filter coefficients. The adaptive cancellation signal is sent to a second input port of the RF signal combiner. The filter coefficients are repeatedly calculated. The filter coefficients are calculated by the adaptive cancellation RF waveform generator. The filter coefficients are calculated, based on the signal from the RF receiver, such that the adaptive cancellation signal attenuates an unwanted signal, without use of a circulator.

A first training signal may be sent by the RF waveform generator, while the adaptive cancellation RF waveform generator sends no adaptive cancellation signal. The first training signal may be provided to the first output port of the RF signal splitter. Information about the signal from the RF receiver as a result of the RF receiver receiving the first training signal may be stored. The information may be stored by the adaptive cancellation RF waveform generator. A second training signal may be sent by the adaptive cancellation RF waveform generator. The second training signal may be substantially identical to the first training signal. The second training signal may be sent while the RF waveform generator provides no signal to the first output port of the RF signal splitter. At least some of the filter coefficients may be calculated, based on the stored information and on the signal from the RF receiver. The signal from the RF receiver may be a result of the RF receiver receiving the second training signal.

Optionally, a training signal may be generated by a signal generator, other than a filter in the adaptive cancellation RF waveform generator. The training signal may be sent to the second input port of the RF signal combiner via a switch.

Sending the second training signal may include using pass-through filter coefficients in the adaptive cancellation RF waveform generator to generate the second training signal.

Sending the second training signal may include selectively bypassing a filter in the adaptive cancellation RF waveform generator.

The RF receiver may include an analog-to-digital converter (ADC). The ADC may include a sample-and-hold circuit coupled to the input port of the RF receiver to sample a signal present at the input port of the RF receiver. The method may also include repeatedly controlling timing of sending the adaptive cancellation signal, such that the adaptive cancellation signal arrives at the ADC while the sample-and-hold circuit samples the signal present at the input port of the RF receiver.

An antenna may be coupled to the input port of the RF signal splitter.

Optionally, frequency of the RF signal generated by the RF waveform generator may be up-converted. Frequency of the adaptive cancellation signal may be up-converted. Frequency of the signal provided to the input port of the RF receiver may be down-converted.

Yet another embodiment of the present invention provides an adaptive, simultaneous transmit and receive (STAR) radio-frequency (RF) communication system. The system includes a plurality of self-interference cancellation circuits. Each self-interference cancellation circuit is connectable to a distinct antenna associated with the self-interference cancellation circuit. Each self-interference cancellation circuit includes an RF signal splitter, an RF waveform generator, an RF signal combiner and an adaptive cancellation RF waveform generator.

The RF signal splitter includes an input port, a first output port and a second output port. The input port is coupleable to the antenna associated with the self-interference cancellation circuit.

The RF waveform generator includes an output port coupled to the first output port of the RF splitter.

The RF signal combiner includes a first input port, a second input port and an output port. The first input port is coupled to the second output port of the RF signal splitter.

The RF receiver includes an input port and an output port. The input port is coupled to the output port of the RF signal combiner. The output port provides a signal representative of a signal present at the input port.

The adaptive cancellation RF waveform generator includes a filter, an adaptive filter coefficient calculator, a first signal input port, a second signal input port for each self-interference cancellation circuit and a signal output port.

The output port of the adaptive cancellation RF waveform generator is coupled to the second input port of the RF signal combiner. The first signal input port is coupled to the output port of the RF receiver to receive the signal representative of the signal present at the input port of the RF receiver. Each second signal input port is coupled to the RF waveform generator in each respective self-interference cancellation circuit. The second signal input port receives a signal from the RF waveform generator representative of a respective signal the RF waveform generator sends via its respective output port.

The filter is coupled between the second signal input ports and the signal output port. The filter generates an adaptive cancellation signal derived from the signals from the RF waveform generators. The filter generates the adaptive cancellation signal based on filter coefficients. The filter sends the adaptive cancellation signal via the signal output port.

The adaptive cancellation RF waveform generator repeatedly calculates the filter coefficients, based on the signal from the RF receiver, such that the adaptive cancellation signal attenuates an unwanted signal, without use of a circulator. The adaptive cancellation RF waveform generator sends information about the filter coefficients to the other adaptive cancellation RF waveform generators for use in their filter coefficient calculations.

An embodiment of the present invention provides a computer program product for providing an adaptive, simultaneous transmit and receive (STAR) radio-frequency (RF) communication system. The computer program product includes a non-transitory computer-readable medium having computer readable program code stored thereon. The computer readable program code is configured to generate an RF signal by an RF waveform generator. The RF sign is to be provided to a first output port of an RF signal splitter. A signal is to be provided from a second output port of the RF signal splitter to a first input port of an RF signal combiner. A signal from an output port of the RF signal combiner is to be provided to an input port of an RF receiver.

The computer readable program code is configured to receive an RF signal at the RF receiver. The computer readable program code is configured to receive, at an adaptive cancellation RF waveform generator, a signal from the RF receiver representative of a signal present at the input port of the RF receiver. The computer readable program code is configured to receive, at the adaptive cancellation RF waveform generator, a signal from the RF waveform generator representative of the RF signal provided to the first output port of the RF signal splitter. The computer readable program code is configured to generate, at the adaptive cancellation RF waveform generator, based on filter coefficients, an adaptive cancellation signal derived from the signal from the RF waveform generator. The computer readable program code is configured to send the adaptive cancellation signal to a second input port of the RF signal combiner. The computer readable program code is configured to repeatedly calculate, by the adaptive cancellation RF waveform generator, the filter coefficients, based on the signal from the RF receiver, such that the adaptive cancellation signal attenuates an unwanted signal, without use of a circulator.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for coupling a transmitter and a receiver to an antenna for simultaneous transmission and reception of radio-frequency (RF) signals (including microwave signals), while attenuating unwanted transmitter signals and reflections thereof before they reach the receiver, without a circulator.

As used herein, a simultaneous transmit and receive system is one that transmits radio-frequency (RF) (including microwave) signals at the same time, or nearly the same time, as it receives RF signals. The receiver in such a system may be on or off during transmissions. The transmitted signals may be of the same frequency, or within a relatively narrow frequency band, as the received signals. In some cases, such as in a frequency-hopping system, the transmit and receive frequencies may be harmonically related. In some cases, the transmit and receive frequencies may be simply different.

Digital Adaptive Cancellation RF Waveform Generator

Figure 1:
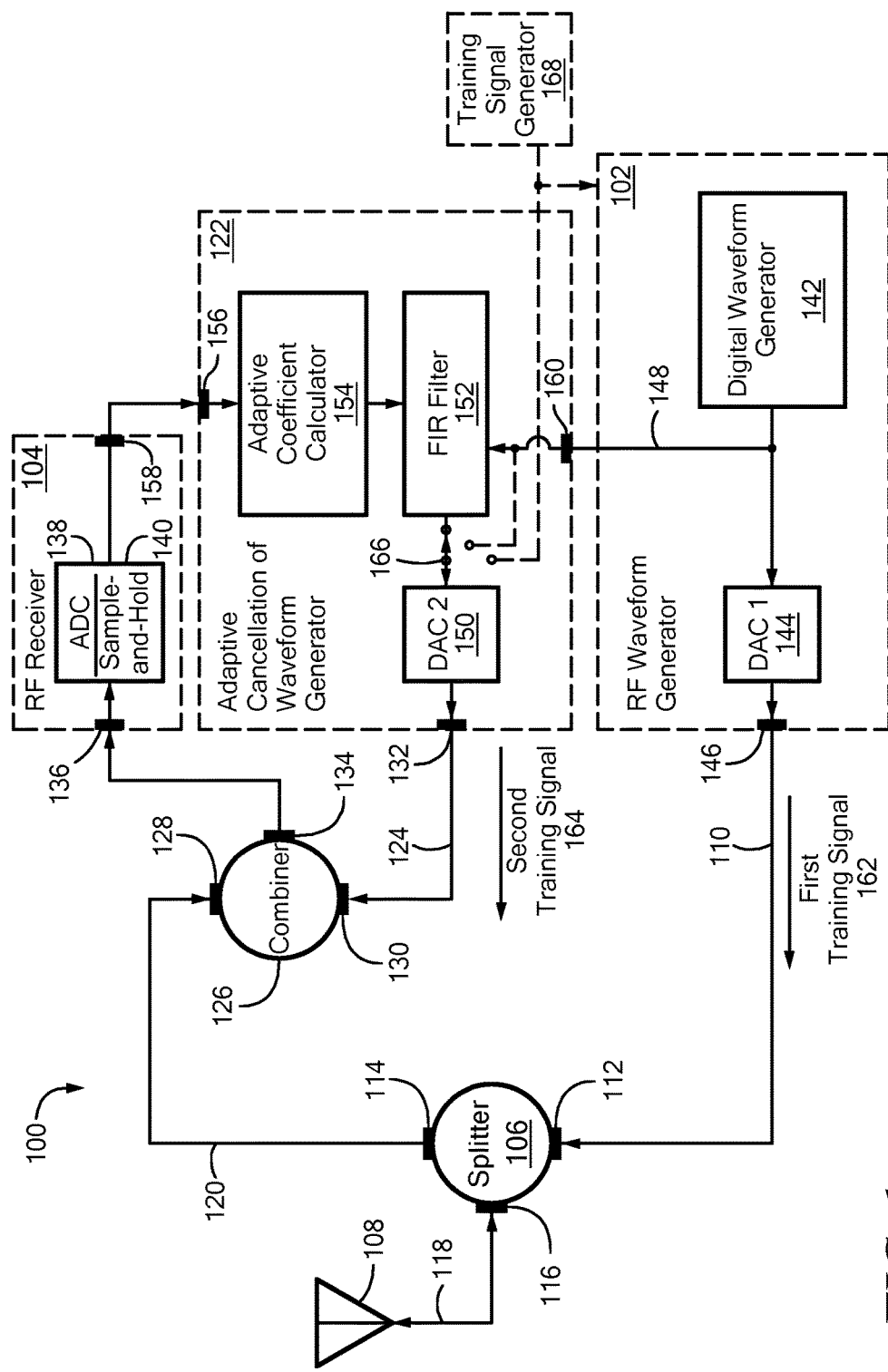
FIG. 1 is a schematic block diagram of an adaptive, simultaneous transmit and receive (STAR) radio-frequency (RF) communication system, according to an embodiment of the present invention.

FIG. 1 is a schematic block diagram of an adaptive, simultaneous transmit and receive (STAR) radio-frequency (RF) communication system 100, according to an embodiment of the present invention. As used herein, RF includes microwave frequencies. An RF waveform generator 102, which is essentially an RF transmitter, and an RF receiver 104 are coupled via an RF signal splitter 106 to an antenna 108 for simultaneous transmission and reception on essentially the same frequency (which may includes within a relatively narrow frequency range and/or harmonically related or within a relatively narrow range of being harmonically related). The RF signal splitter 106 does not include a circulator. The RF transmitter 102 generates an RF signal 110 and feeds it to a first output port 112 of the RF splitter 106. The RF receiver 104 is coupled to the RF splitter 106 via a second output port 114.

The RF splitter 106 forwards most or all of the RF signal 110 from the RF transmitter 102 to the antenna 108 via the RF splitter's input port 116 and a transmission line 118, and the antenna 108 radiates most of the RF signal fed to it from the RF transmitter 102. However, a portion of the RF signal fed to the antenna 108 may be reflected by the antenna 108 back down the transmission line 118. Similarly, portions of the RF signal from the RF transmitter 102 may be reflected by portions of the transmission line 118, such as by transmission line couplings or other impedance discontinuities. Portions of the radiated signal may be reflected back to the antenna 108 by other antenna elements (not shown), antenna mounting hardware or other objects (not shown), not counting an object tracked by radar. Such reflections are unwanted signals. In contrast, radar signals reflected by tracked objects and signals received by the antenna 108 from a distant transmitter (not shown) are wanted signals.

Signals received by the antenna 108, and the unwanted signals described above, are delivered to the RF splitter 106, which splits the signals between its two output ports 112 and 114. The portion 120 of the signals exiting the RF splitter 106 via the second output port 114 are forwarded toward the RF receiver 104.

The RF signal splitter 106 typically does not provide perfect isolation between its two output ports 112 and 114. Consequently, a portion of the RF signal 110 fed into the first output port 112 exits the RF signal splitter 106 via the second output port 114 and is forwarded toward the RF receiver 104. This portion of the RF signal 110 is also an unwanted signal.

Furthermore, parasitic capacitances between circuit elements may couple portions of the RF signal from the RF transmitter 102 into circuits of, or leading to, the RF receiver 104. These coupled signals are also unwanted signals.

All the unwanted signals that directly or indirectly originate in the RF transmitter 102 are self-interference signals, also referred to herein as cross-talk from one portion of a system to the RF receiver 104 or a circuit feeding toward the RF receiver 104. As noted, absent a special circuit, self-interference signals can overwhelm wanted signals received by the antenna 108 and prevent the RF receiver 104 being able to process the wanted signals.

In this embodiment, an adaptive cancellation RF waveform generator 122 generates an adaptive cancellation signal 124 to cancel all or some of the self-interference signals. An RF signal combiner 126 combines the signal 120 from the RF signal splitter 106 with the adaptive cancellation signal 124, and the adaptive cancellation signal 124 cancels some or all of the self-interference. The combiner 126 includes a first input port 128 coupled to the second output port 114 of the RF signal splitter 106, and a second input port 130 coupled to an output port 132 of the adaptive cancellation RF waveform generator 122. The RF signal combiner 126 also includes an output port 134 coupled to an input port 136 of the RF receiver 104.

The RF receiver 104 includes an analog-to-digital converter (ADC) 138. The ADC includes a sample-and-hold circuit 140 to sample a signal present at the input port 136 of the RF receiver 104.

The RF transmitter 102 includes a digital waveform generator 142 that drives a first digital-to-analog converter (DAC) 144. Analog output of the DAC 144 is provided via an output port 146 of the RF transmitter 102. The RF transmitter 102 also provides a digital version 148 of the generated waveform.

In this embodiment, the adaptive cancellation waveform generator 122 includes a second digital-to-analog converter (DAC) 150 to generate the analog adaptive cancellation signal 124. The DAC 150 is fed by a finite impulse response (FIR) filter 152, such as a Kalman filter. Coefficients for the filter 152 are calculated by an adaptive coefficient calculator 154. A first signal input port 156 of the adaptive cancellation waveform generator 122 is coupled to an output port 158 of the RF receiver 104 to receive a digital signal representative of the analog signal present at the input port 136 of the RF receiver 104. A second signal input port 160 is coupled to the RF transmitter 102 to receive the digital version 148 of the waveform generated by the RF transmitter 102.

The filter 152 generates an adaptive cancellation signal derived from the signal 148 from the RF transmitter 102. The filter 152 generates the adaptive cancellation signal, based on the filter coefficients from the adaptive coefficient calculator 154. The adaptive coefficient calculator 154 repeatedly calculates the filter coefficients, based on the signal from the RF receiver 104, such that the adaptive cancellation signal 124 attenuates an unwanted signal, such as as much of the self-interference as possible or desired, without use of a circulator.

The adaptive cancellation waveform generator 122 is an adaptive filter subsystem, i.e., a subsystem with a linear digital filter 152 that has a transfer function controlled by variable parameters (the coefficients) and a means (the adaptive coefficient calculator 154) to adjust those parameters according to an optimization algorithm. An adaptive filter is used, because some parameters of the desired filter processing operation, for example locations of objects that reflect signals, may not be known in advance or may change over time. In addition, the RF signal 110 from the RF transmitter 102 may change over time and, consequently, the unwanted signal may change over time. Furthermore, physical parameters of the circuit, such as temperature and, therefore, propagation time of signals through the circuit may change over time, as discussed in more detail herein. The adaptive cancellation waveform generator 122 is a closed-loop adaptive filter, in that it uses feedback to refine its transfer function, which enables it to track and compensate for changes over time.

No Circulator Used

It should be noted that no embodiments of the present invention uses a circulator to isolate the RF receiver 104 from RF signals 110 from the RF transmitter 102. Disadvantages of circulators are discussed in the Background Art section of this application. The RF splitter 106 avoids many of the disadvantages of circulators. On the other hand, the RF splitter 106 may increase cross-talk, such as due to less isolation between the two output ports 112 and 114 of the RF splitter 106 than a circulator may provide. However, embodiments of the present invention compensate for at least a bulk of the RF splitter-induced cross-talk.

A circuit that includes an embodiment of the present invention may also include a circulator, as long as the circulator is not used to direct the RF signal 110 from the RF transmitter 102 to the antenna 108 (and not to the RF receiver 104) and to direct signals received by the antenna 108 toward the RF receiver 104. However, even in such a circuit, the adaptive cancellation signal attenuates an unwanted signal, without use of a circulator, as recited in the claims.

Novel Use of a RF Signal Splitter

It should be noted that the RF signal splitter 106 is used in an unconventional and non-obvious way. Conventionally, a signal is fed into a signal splitter via its input port, and portions of the signal exit the splitter via its respective output ports and are directed to respective circuits. However, in embodiments of the present invention, the RF signal 110 from the RF transmitter 102 is fed into an output port of the RF signal splitter 106, rather than into an input port. This usage cannot be explained by referring to the RF signal splitter 106 as a signal combiner, because no signal is fed to the other input port 114 of the RF signal splitter 106. Thus, the RF signal splitter 106 does not function as a combiner. Furthermore, signals both enter and exit the RF signal splitter 106 via the input port 116. Such usage of a signal splitter is not taught or suggested in the prior art.

The prior art teaches feeding a test signal into an output of a signal splitter to test isolation between or among output ports of the signal splitter. However, during such testing, the input port is terminated by a dummy load. The input port is not connected to an antenna, as in embodiments of the present invention. During such testing, the test signal is fed into one output port, and all but one of the remaining output ports are terminated by respective dummy loads. A signal level is measured at the remaining output port, and the isolation value of that port is determined from the signal level. This process is repeated for each remaining output port, and then the test signal is fed into the next output port and the process is repeated. However, as noted, all ports (input and output), except the two ports under test, are terminated by respective dummy loads. Thus, such testing does not teach or suggest coupling an RF transmitter to one output port, coupling an RF receiver to another output port and coupling an antenna to the input port of a signal splitter, as is done in embodiments of the present invention.

Experimental Setup and Results

Figure 2:
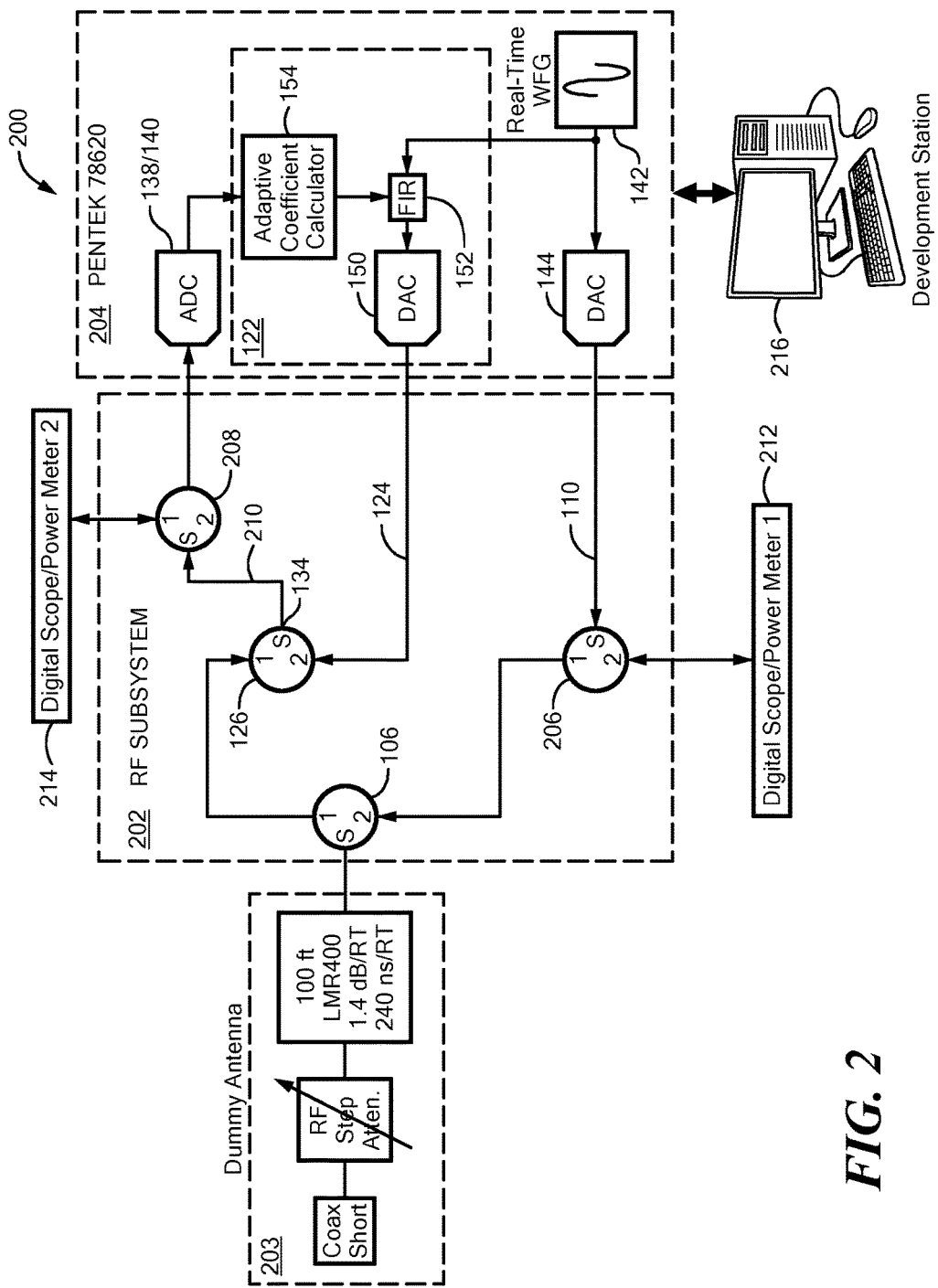
FIG. 2 is a schematic block diagram of an adaptive, simultaneous transmit and receive RF communication system, similar to the system of FIG. 1, but including additional components to facilitate testing the system, according to an embodiment of the present invention.

Experiments were conducted using a Cobalt Model 78620 multi-channel, high-speed data converter (3-channel, 200 MHz ADC; 2-channel 800 MHz DAC; and FPGA), available from Pentek, Inc., One Park Way, Upper Saddle River, N.J. 07458, USA. FIG. 2 is a schematic block diagram of an adaptive, simultaneous transmit and receive RF communication system 200, similar to the system 100 of FIG. 1, but including additional components to facilitate testing the system 200, according to an embodiment of the present invention.

As shown in FIG. 2, the system 200 includes an RF subsystem 202 that operates in the analog domain, and a digital subsystem 204. The digital subsystem 204 is implemented by portions of the Cobalt Model M78620 data converter, including the digital waveform generator 142, DAC 144, ADC 138, sample-and-hold circuit 140, adaptive coefficient calculator 154, filter 152 and DAC 150, as interconnected and configured according to an embodiment of the present invention. The RF signal splitter 106 and the RF signal combiner 126 are conventional, commercially available components with suitable specifications for frequencies and power levels of interest. A dummy antenna 203 was coupled to the input of the RF signal splitter 106, although a real antenna could have been used.

For test purposes, two additional RF signal splitters 206 and 208 were included to facilitate analyzing the RF signal 110 from the DAC 144 and a signal 210 from the output port 134 of the RF signal combiner 126. Respective digital oscilloscopes/power meters 212 and 214 analyze portions of the signals 110 and 210 provided by the RF signal splitters 206 and 208, respectively. A development station computer 216 was used to program the Cobalt Model M78620 data converter.

Figure 3:
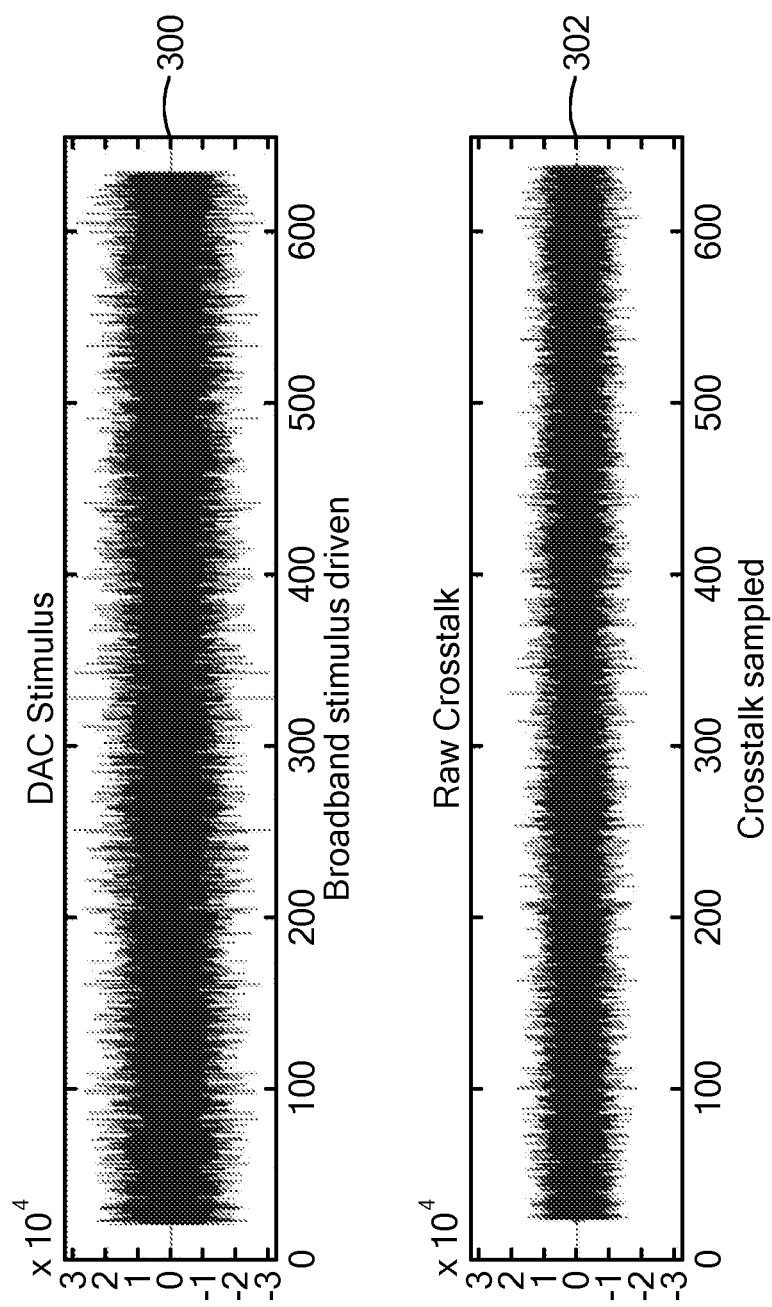
FIGS. 3 and 4 illustrate exemplary actual signals of the adaptive, simultaneous transmit and receive RF communication system of FIG. 2, with an adaptive cancellation RF waveform generator turned off (FIG. 3) and operational (FIG. 4), respectively.

FIG. 3 illustrates exemplary actual signals 300 and 302 analyzed by the instruments 212 and 214, respectively, with the adaptive cancellation RF waveform generator 122 disabled. As can be seen, signal 302 is highly contaminated by cross-talk from signal 300.

Figure 4:
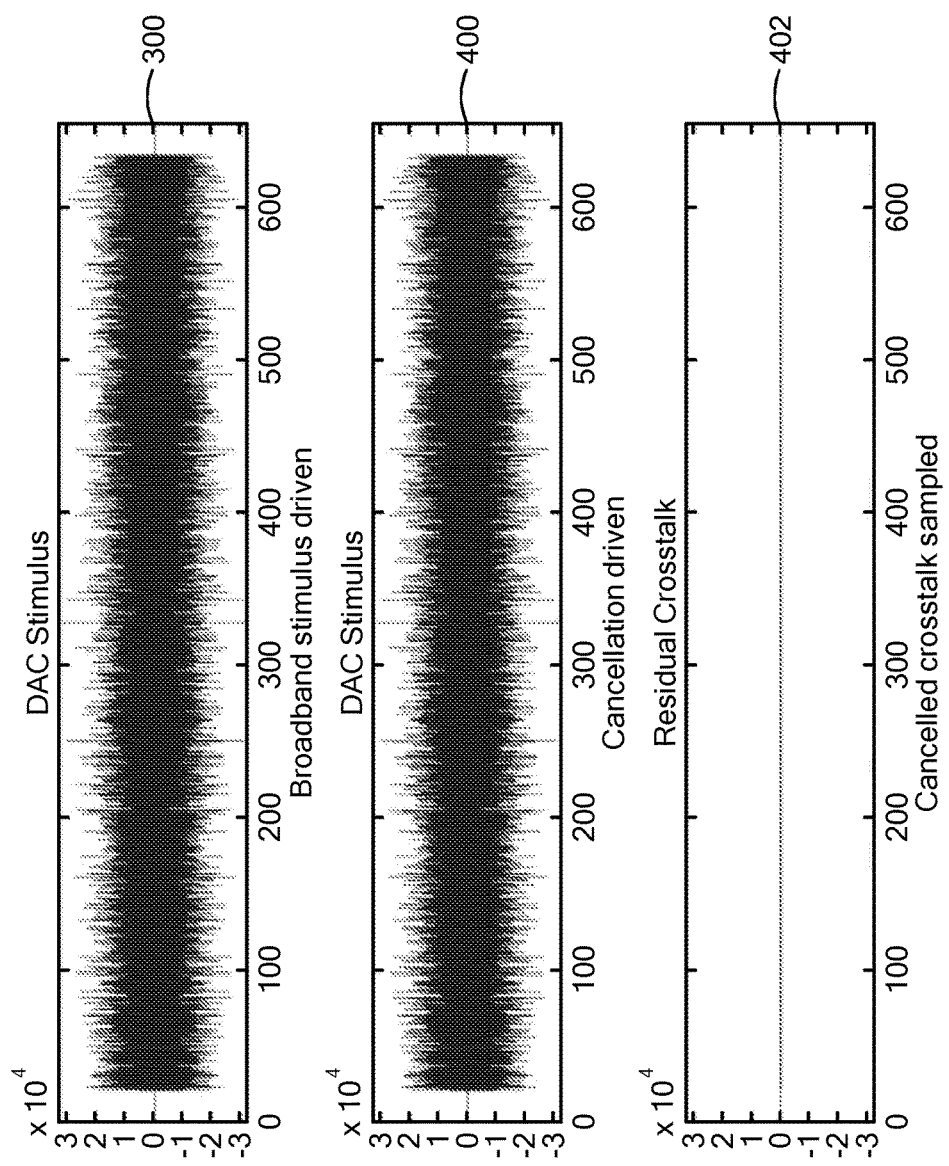

FIG. 4 illustrates exemplary actual signals 400 and 402 analyzed by the instruments 212 and 214, respectively, with the adaptive cancellation RF waveform generator 122 operational. Signal 400 is the adaptive cancellation signal 124 generated by the adaptive cancellation RF waveform generator 122. As can be seen in signal 402, the cross-talk is effectively cancelled. At baseband, up to about 200 MHz, about 75 dB of cancellation was achieved over an about 20 MHz bandwidth.

Figure 5:
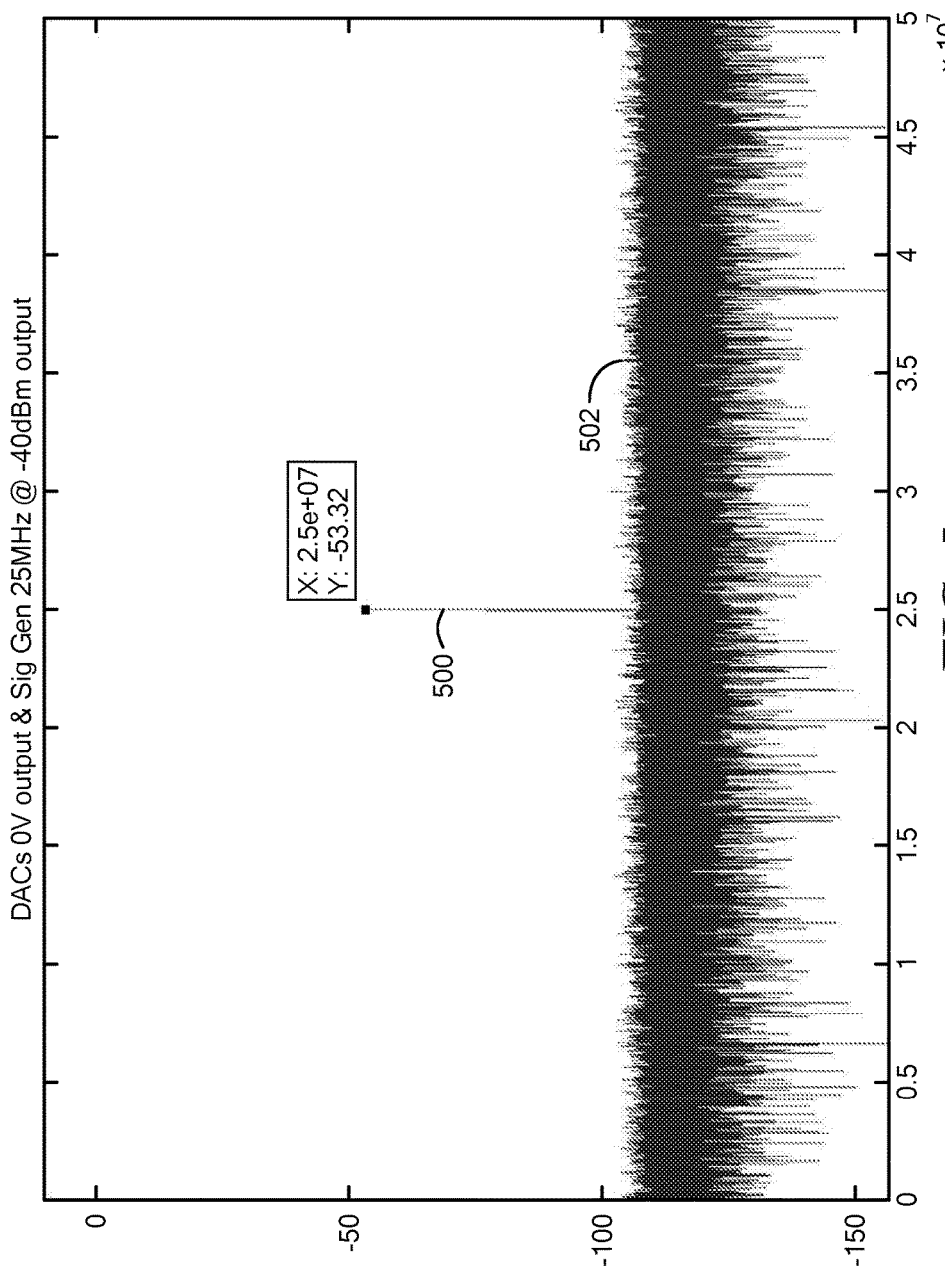
FIGS. 5-9 contain additional plots illustrating cancellation of an actual test system, according to an embodiment of the present invention.
Figure 6:
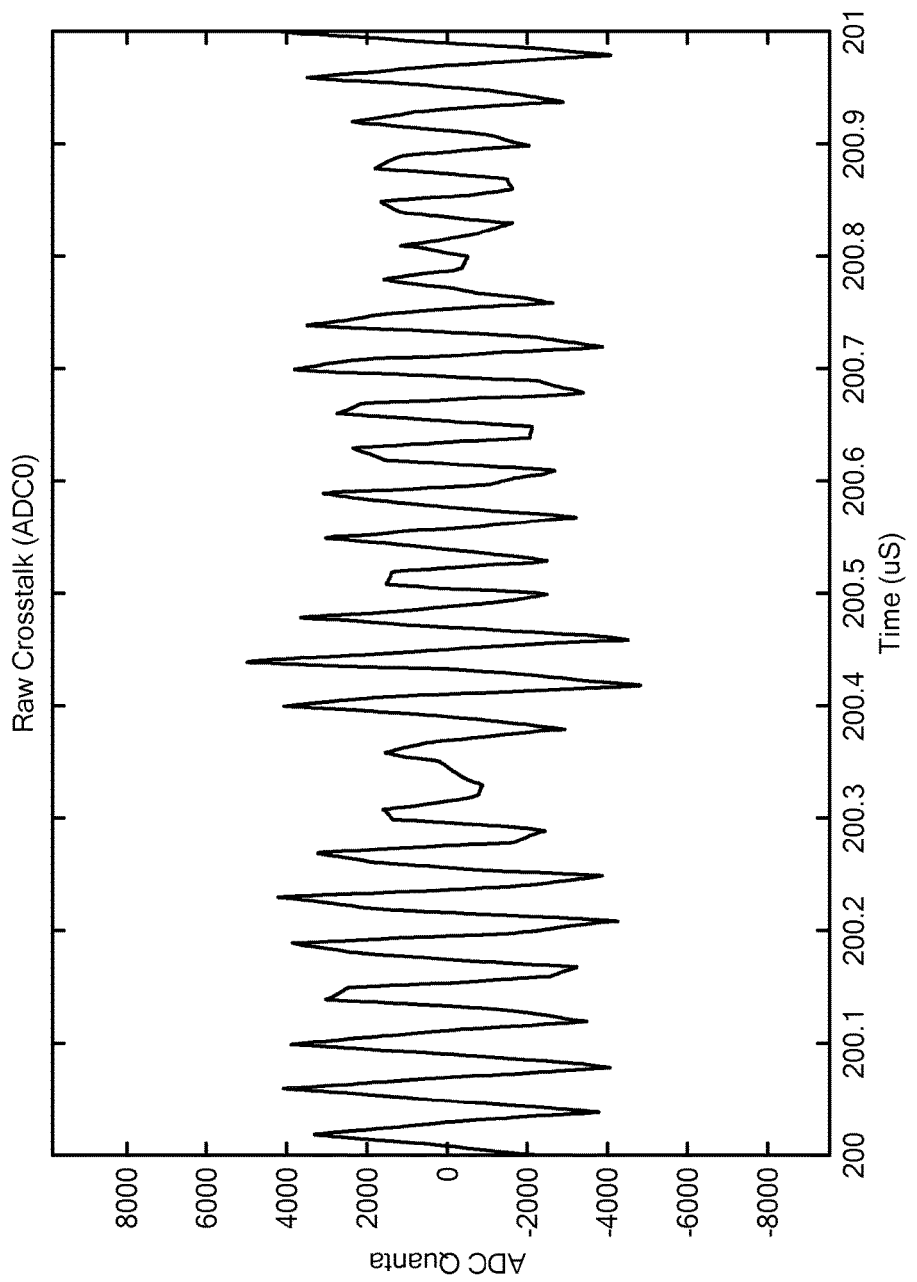
Figure 7:
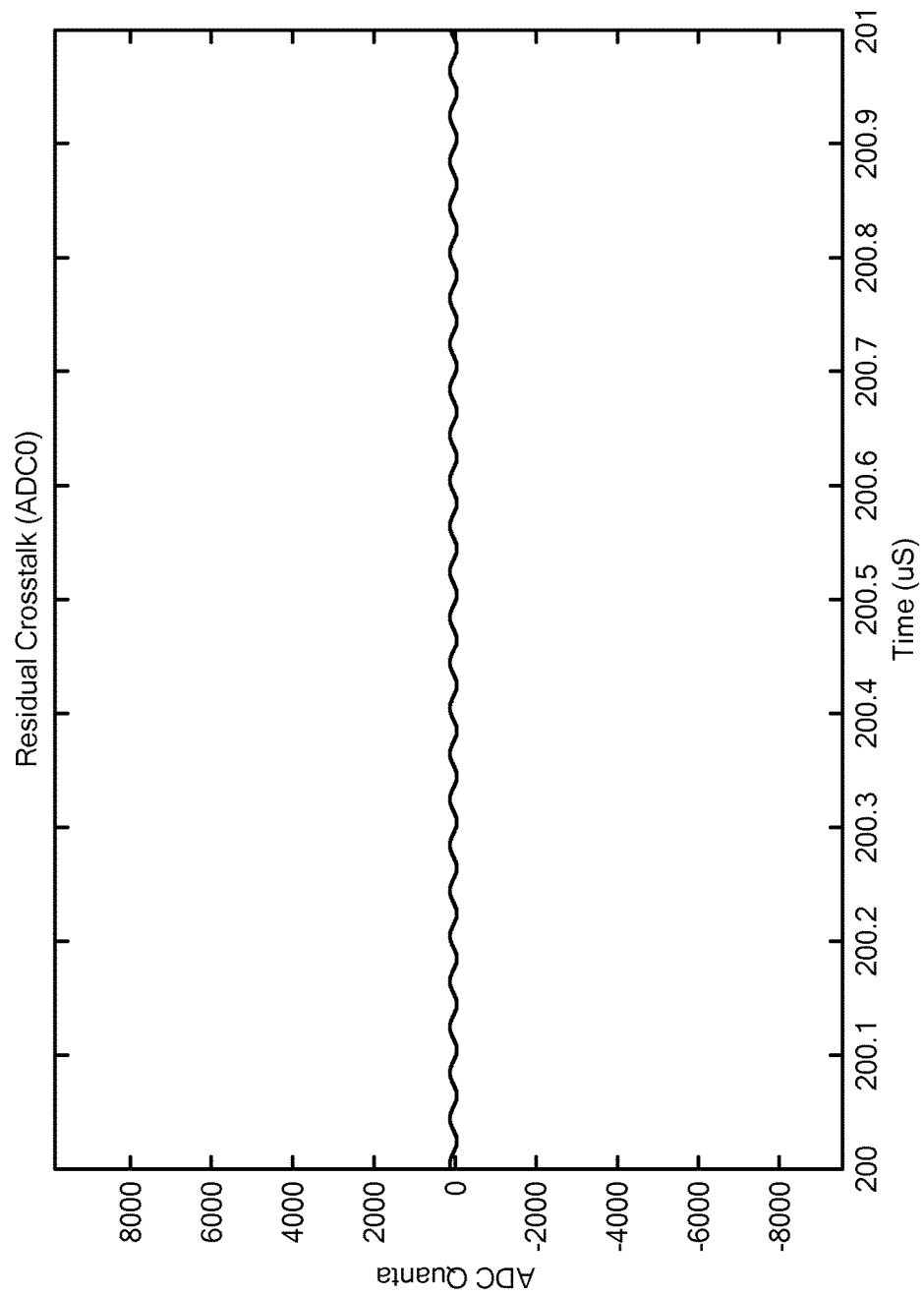
Figure 8:
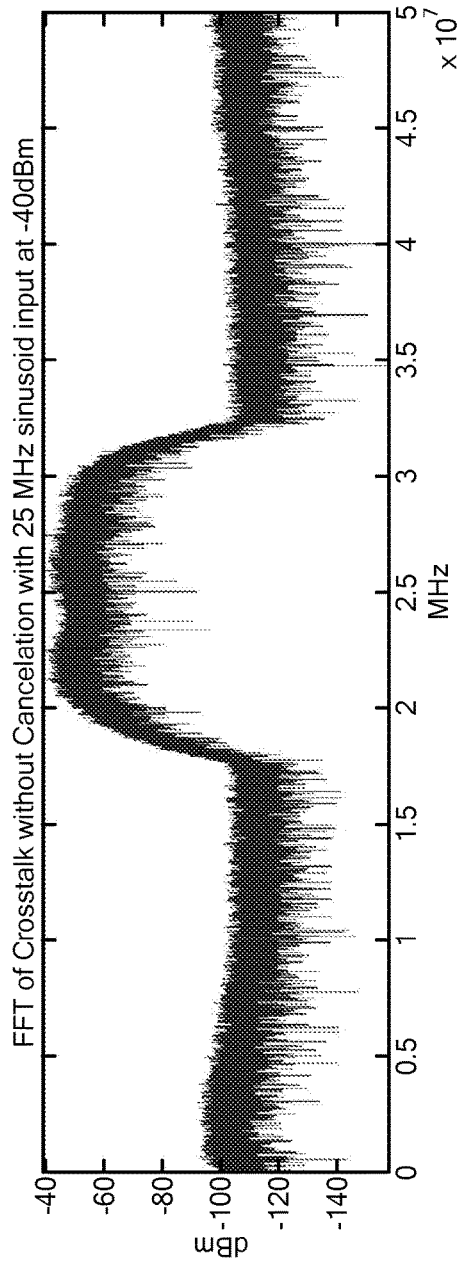
Figure 9:
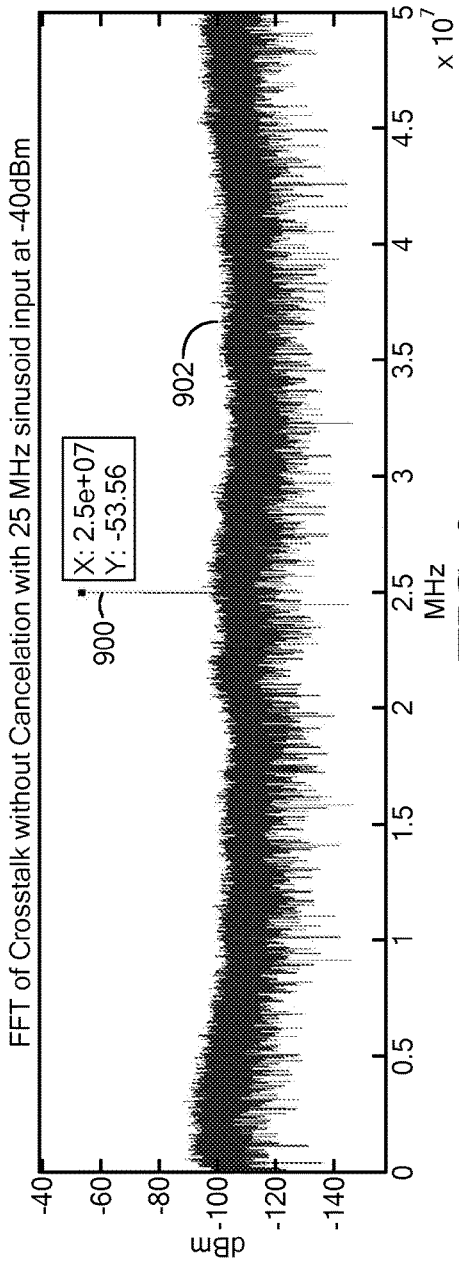

FIGS. 5-9 contain additional plots illustrating cancellation of an actual test system, according to the present invention. FIG. 5 is a power spectral density (PSD) plot of a signal analyzed by the instrument 214 (FIG. 2), with no self-interference. An incoming 25 MHz signal 500 at about −53.32 dBm is clearly evident above the noise floor 502. FIG. 6 is a plot, versus time, of a portion of the signal in FIG. 5, with self-interference, but without any cancellation. FIG. 7 is a plot like FIG. 6, except with cancellation. The signal is clearly visible in the plot of FIG. 7. FIGS. 8 and 9 are PSD plots of the signals of FIGS. 6 and 7, respectively. Again, the 25 MHz signal 900, at −53.56 dBm, is clearly visible above the noise 902 floor in FIG. 9, with little loss from the plot in FIG. 5, demonstrating that the embodiment does not significantly attenuate the wanted signal.

Equivalent Circuits

Figure 10:
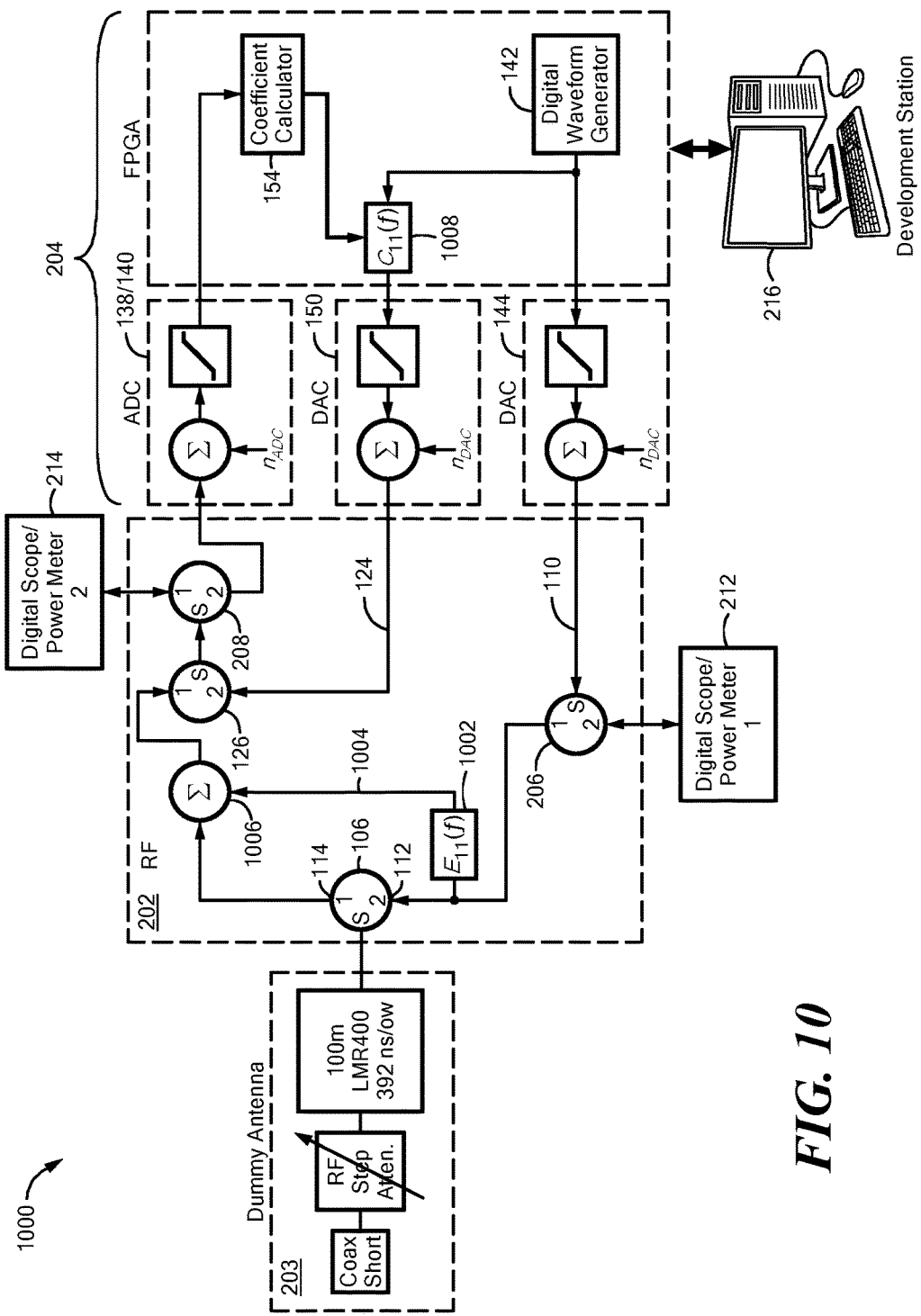
FIG. 10 is a schematic block diagram of an equivalent circuit that models signal flow through an adaptive, simultaneous transmit and receive RF communication system, such as the systems of FIGS. 1 and 2.

FIG. 10 is a schematic block diagram of an equivalent circuit 1000 that models signal flow through an adaptive, simultaneous transmit and receive RF communication system, such as the system 100 or 200 of FIGS. 1 and 2. The circuit 1000 includes a path of cross-talk in the system and a path of correction terms in the system. In other respects, the circuit 1000 is similar to the systems of FIGS. 1 and 2.

As noted, the cross-talk may include several components. One component may result from less than perfect isolation by the RF signal splitter 106 between its two output ports 112 and 114. Other components may result from reflections from the dummy antenna 203 and/or parasitic capacitive coupling between transmitter and receiver circuitry. In FIG. 10, the cross-talk is modeled as a lump 1002, characterized as an error term $E_{11}(f)$, an error term path 1004 and an adder 1006. The Adder 1006 adds the error term 1002 to the signal path extending toward the RF receiver ADC 138.

Similarly, a correction term 1008 is characterized as a correction term $C_{11}(f)$, which is used to generate the adaptive cancellation signal 124.

It should be noted that the error term 1002, the error path 1004, the adder 1006 and the correction term 1008 do not exist as discrete components in the systems shown in FIGS. 1 and 2. They are merely represented by circuit components in the equivalent circuit model 1000 of FIG. 10 to facilitate explanation.

Training Sequence

The adaptive cancellation waveform generator 122 (FIGS. 1-2) includes a closed-loop, adaptive filter system. Returning to FIG. 1, to initiate the closed loop, the system 100 utilizes training signals 162 and 164. The training signals 162 and 164 may be sent during initialization of the system 100 and/or periodically or occasionally thereafter, while the system 100 operates. The training signals 162 and 164 enable the adaptive cancellation waveform generator 122 to characterize two signal paths and calculate at least initial filter coefficients to cancel unwanted signals originating at the RF transmitter 102. The first training signal 162 is sent while the adaptive cancellation waveform generator 122 does not generate any signal 124. Ideally, the first training signal 162 is substantially identical to a signal the RF transmitter 102 will generate during normal operation, although possibly at reduced power.

As a result of the first training signal 162 being sent, the RF receiver 104 receives a signal at its input port 136, as described above, and the RF receiver 104 generates a signal representative of the signal present at the input port 136 of the RF receiver 104. Recall that no adaptive cancellation signal 124 is being generated. Therefore, the signal received by the RF receiver 104 includes the self-interference signals described above, without cancellation. The adaptive cancellation RF waveform generator 122 stores information about the signal from the RF receiver 104 as a result of the RF receiver receiving the first training signal 162.

For example, the adaptive cancellation RF waveform generator 122 receives the signal 148 from the RF transmitter 102, so the adaptive cancellation RF waveform generator 122 can compare the signal sent by the RF transmitter to the signal received by the RF receiver 104 to calculate differences between these two signals. The differences represent the self-interference. In addition, the adaptive cancellation RF waveform generator 122 can measure time required for the first training signal 162 to propagate through the circuit 100, i.e., the time between when the RF transmitter 102 sends the first training signal 162 and the time the adaptive cancellation RF waveform generator 122 receives the signal from the RF receiver 104. This and other information may be stored.

After the RF transmitter 102 finishes sending the first training signal 162 and the system 100 reaches quiescence, the adaptive cancellation RF waveform generator 122 sends the second training signal 164. The RF transmitter 102 sends no RF signal 110 or 162 while the second training signal 164 is being sent. The second training signal 164 is substantially identical to the first training signal, although it may be sent at a different power level than the first training signal 162.

The signal received by the RF receiver 104, as a result of the second training signal 164, includes any distortion of the second training signal 164 introduced along its path. The adaptive cancellation RF waveform generator 122 can, therefore, calculate the distortion by subtracting the signal it receives from the RF receiver 104 from the original second training signal 164 and calculate filter coefficients that compensate for the distortion. In addition, the adaptive cancellation RF waveform generator 122 can measure time required for the second training signal 164 to propagate through the circuit 100.

The adaptive cancellation RF waveform generator 122 then calculates at least some of the filter coefficients, based on the stored information and the signal from the RF receiver as a result of the RF receiver 104 receiving the second training signal 164. For example, the self-interference calculated and stored above may be used to calculate filter coefficients that would modify the signal 148 from the RF transmitter 102 in a way that would cancel the self-interference. For example, all or portions of the signal 148 may be inverted and/or shifted in time to cancel corresponding portions of the RF signal 110 that leaks into the RF receiver 104.

In addition, the adaptive cancellation RF waveform generator 122 may calculate when the adaptive cancellation signal 124 needs to be sent, relative to when the RF transmitter 102 sends the RF signal 110, so both signals arrive at the same time at the combiner 126 or, alternatively, at the RF receiver 104. Based on a difference in propagation times of the first and second training signals 162 and 164, the adaptive cancellation RF waveform generator 122 calculates an amount of time by which generation of the adaptive cancellation signal 124 should lead or lag generation of the RF signal 110, and this lead or lag time may be included in the generated filter coefficients.

The training sequence described above may be repeated multiple times, such as tens of thousands of times, and results may be integrated to reduce errors in the calculated filter coefficients. The first and second training signals 162 and 164 may be interlaced in the training sequence, as described above. Optionally or alternatively, the first training signal 162 may be send multiple times, and then the second training signal 164 may be sent multiple times. Other orderings of the first and second training signals 162 and 164 are also possible.

The second training signal 164 may be generated in any suitable manner. In some embodiments, essentially "passthrough" filter coefficients are used by the filter 152 to pass the signal 148 from the RF transmitter 102 unchanged to the DAC 150. Although it may not be possible to implement a real filter with perfect pass-through characteristics, a reasonable approximation may be implemented. In some embodiments, a switch 166 is used to bypass the filter 152 and forward the signal 148 to the DAC 150. In some embodiments, the switch 166 is used to couple a separate training signal generator 168 to the DAC 150. In embodiments that include the separate training signal generator 168, the signal from the training signal generator 168 may also be provided to the RF transmitter 102, and the RF transmitter 102 may use the signal from the training signal generator 168, instead of a signal from the digital waveform generator 142, to generate the first training signal 162.

Timing and Repeatability Considerations

As noted, the RF receiver 104 includes an ADC 138 having a sample-and-hold circuit 140. As known to those skilled in the art, the ADC 138 therefore samples the signal present at the input port 136 to the RF receiver 104 at discrete times, not continuously, and the rate at which the ADC samples the signal needs to be at least the Nyquist rate. The sample-and-hold circuit may include a sample capacitor, which takes a finite amount of time (a "sample time") to charge to sample the input signal.

The adaptive cancellation signal 124 should arrive at the sample-and-hold circuit 140 not later than the time the sample capacitor begins a given sample, and the adaptive cancellation signal 124 should continue until at least the end of the sample time. The adaptive cancellation signal 124 should arrive at the sample-and-hold circuit 140 at least by the beginning of each sample. However, no adaptive cancellation signal 124 is needed between samples. Thus, the adaptive cancellation RF waveform generator 122 may generate the adaptive cancellation signal 124 as a series of relatively short, time spaced-apart signals.

In some embodiments, the filter coefficients for the filter 152 are recalculated for each of the time spaced-apart signals. In some embodiments, the filter coefficients are recalculated more than once for each of the time spaced-apart signals. In some embodiments, the filter coefficients are recalculated less frequently than the time spaced-apart signals are sent. In other words, one set of filter coefficients may be used for more than one time spaced-apart signal.

Important considerations in building system 100 include timing and repeatability. As noted, the adaptive cancellation signal 124 needs to be sent, so it arrives at the combiner 126 or, alternatively, at the RF receiver 104, at the same time as the self-interference signal, otherwise no or little cancellation occurs. In addition, as noted, the adaptive cancellation signal 124 needs to be sent, so it arrives at the sample-and-hold circuit 140 so as to at least overlap the sample time. Thus, timing of generating the RF signal 110 by the RF transmitter 102 and timing of generating the adaptive cancellation signal 124 by the adaptive cancellation RF waveform generator 122 need to be coordinated.

The RF signal 110 is often generated over a relatively long period of time, such as a modulated RF signal in a radiotelephone communication system, or as a long series of rapid pulses in some radar systems. In either case, the adaptive cancellation signal 124 should be generated, in coordination with the RF signal 110, over at least the same relatively long period of time. Hence, the coordinated generation of the adaptive cancellation signal 124 needs to be repeatable.

Changes in temperature of the system 100 can change propagation times along the signal paths discussed herein, as well as changing transfer functions of the signal paths. For example, due to thermal expansion or contraction of materials used to construct components and wiring of the system 100, the signal paths may become physically longer or shorter, thereby altering the propagation times. In addition, other dimensions, such as width or thickness, of the signal paths, as well as component sizes and inter-component spacings, may change, thereby changing their transfer functions. Temperature changes may also affect dielectrics in capacitors, thereby changing the capacitors' capacitances. Relatively small physical changes can cause relatively large changes in characteristics of the signal paths, particularly at microwave frequencies, such as S-band, and higher frequencies.

In some cases, the temperature changes, and therefore the changes in propagation times and transfer functions, are anisotropic over a circuit board on which the components and wiring are mounted. For example, if some or all of the self-interference signal is parasitically coupled through air into the RF receiver 104 signal path, whereas the adaptive cancellation signal 124 path exists entirely as wires and physical components, the temperature changes may affect one signal path more than the other signal path. Consequently, the propagation time and shape of the adaptive cancellation signal 124 may change differently than the propagation time and shape of the self-interference signal. Physical vibration or shock of the circuit board can also isotropically or anisotropically impact the signal paths, such as by altering inter-component spacing, even briefly. Note that vibration or shock may cause a ringing change in the signal path characteristics.

The training sequence described herein automatically compensates for changes, including anisotropic changes, in the two signal paths, because the training signals 162 and 164 essentially allow the adaptive cancellation RF waveform generator 122 to characterize each signal path. Thus, the training sequence should be repeated at a rate greater than an anticipated rate of change in the signal paths. In addition, the training sequence should be repeated whenever the RF signal 110 changes or is expected to change. In some contexts, assuming no changes in the RF signal 110, where the temperature is expected to remain relatively stable and no vibrations are expected or detected (such as by an accelerometer, not shown), the training sequence may be repeated on the order of every few seconds.

In the context of a changing RF signal 110 waveform, the training sequence should be repeated at a rate commensurate with a rate of change in the waveform. An example of such a context is a phased arrays used for dynamic beam forming, such as in an electronically steerable radar. In some embodiments, under these circumstances, the training sequence should be repeated on the order of about hundreds of times per second.

Up-Conversion and Down-Conversion

Figure 11:
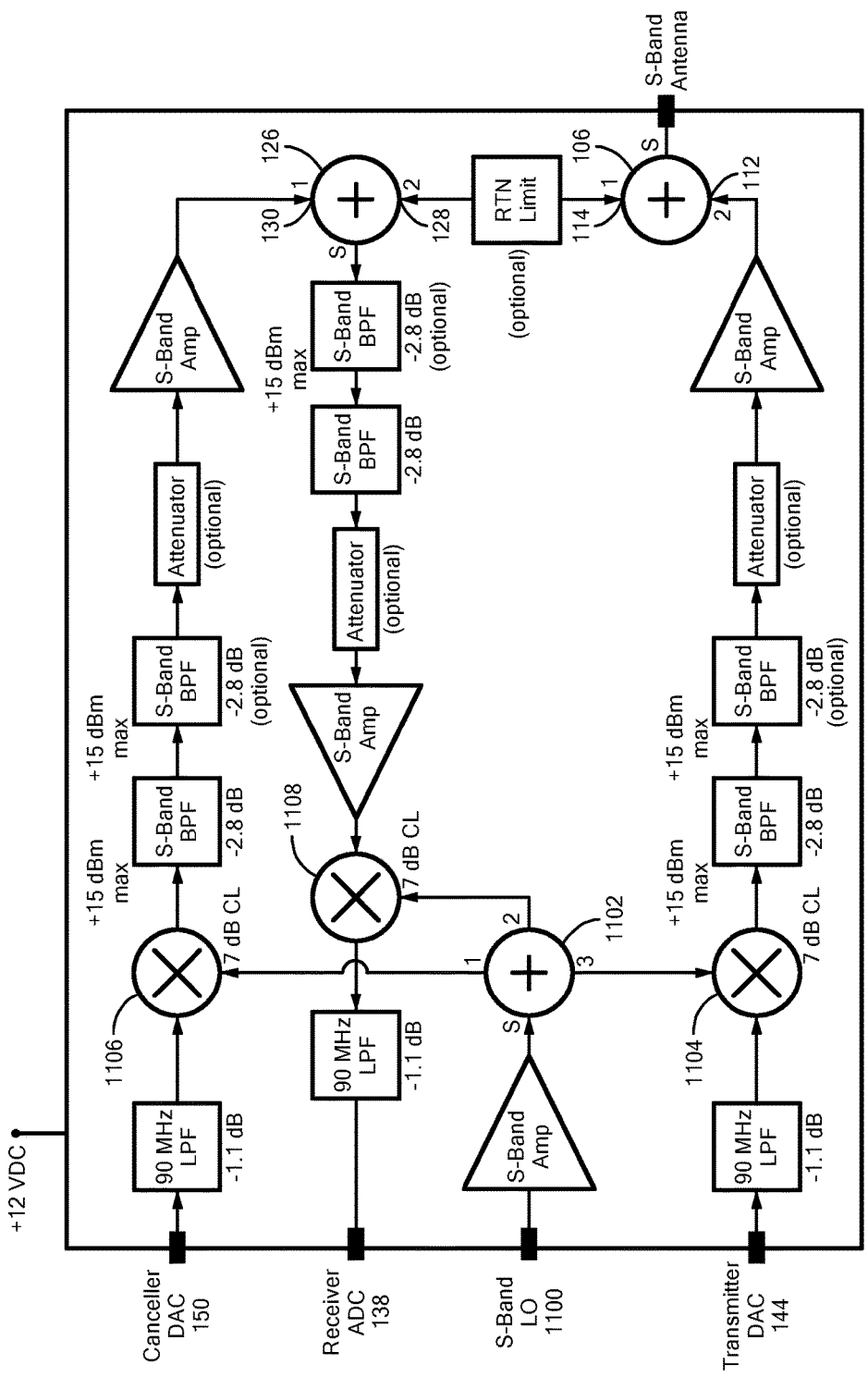
FIG. 11 is a schematic block diagram illustrating a portion of an adaptive STAR RF communication system, in which up- and down-conversion occurs, according to an embodiment of the present invention.

The circuits described with respect to FIGS. 1-10 operate at baseband. In some embodiments, RF signals from an antenna are down-converted in the analog domain before being analog-to-digitally converted and processed in the digital domain. FIG. 11 is a schematic block diagram illustrating a portion of an adaptive STAR RF communication system, in which up- and down-conversion occurs.

The DAC 150 in the adaptive cancellation RF waveform generator 122 described with reference to FIGS. 1 and 2 appears in FIG. 11. Similarly, the ADC 138 in the RF receiver 104 and the DAC 144 in the RF transmitter 102 appear in FIG. 11. In addition, the system in FIG. 11 includes a local oscillator (LO) 1100 to facilitate the up- and down-conversion. A signal splitter 1102 splits a signal from the local oscillator 1100 three ways.

A first mixer 1104 mixes a portion of the local oscillator 1100 signal with the signal from the RF transmitter 102 DAC 144 to up-convert the signal from the RF transmitter 102. In this embodiment, the signal from the RF transmitter 102 may have a frequency lower than conventional RF frequencies.

A second mixer 1106 mixes a portion of the local oscillator 1100 signal with the signal from the adaptive cancellation RF waveform generator 122 DAC 150 to up-convert the signal from the adaptive cancellation RF waveform generator 122. In this embodiment, the signal from the adaptive cancellation RF waveform generator 122 may have a frequency lower than conventional RF frequencies.

The RF signal splitter 106 and the RF signal combiner 126 operate as described with respect to FIGS. 1 and 2.

A third mixer 1108 mixes a portion of the local oscillator 1100 signal with a signal from the RF signal combiner 126 to down-convert the signal from the RF signal combiner 126. In this embodiment, the RF receiver 104 may receive signals having frequencies lower than conventional RF frequencies.

Other components shown in FIG. 11, such as attenuators, amplifiers and filters, are used as in conventional up- and down-converters.

Multiple Antennas

The circuits described with respect to FIGS. 1-11 each includes a single antenna. Some STAR systems, such as phased-array radar systems, include multiple antennas. Each antenna in a multiple-antenna system may be coupled to a separate circuit, and each such circuit may be as described with respect to FIGS. 1-11. In a multiple-antenna system, the individual antennas are often physically proximate each other. Consequently, much cross-talk can occur between and among the antennas.

Figure 12:
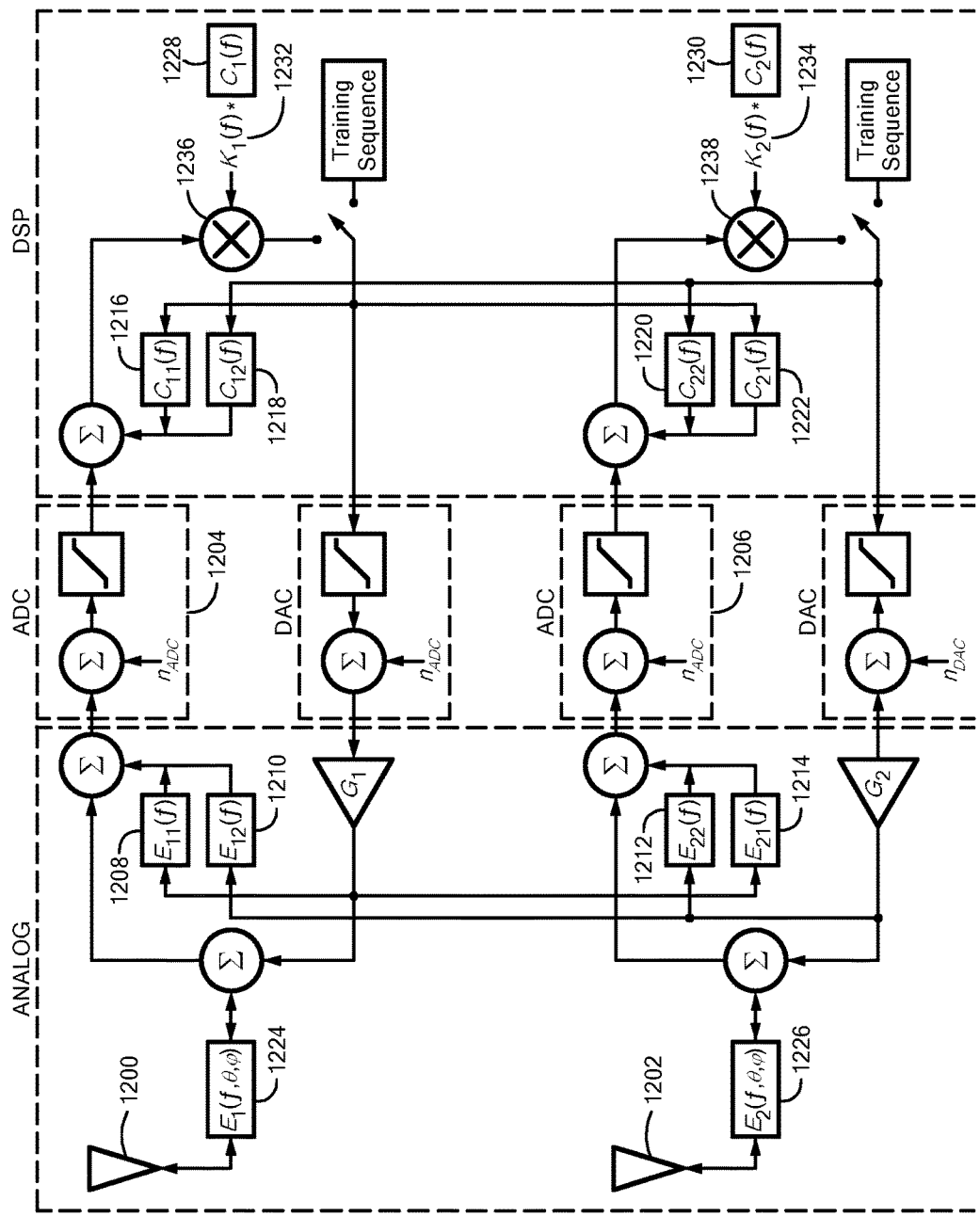
FIG. 12 is a schematic block diagram of an equivalent circuit that models signal flow through a multiple-antenna adaptive, simultaneous transmit and receive RF communication system, according to an embodiment of the present invention.

Cross-talk in this context includes unwanted signals originating in one antenna's transmitter being introduced into a receive path of another antenna's receiver. For example, signals radiated by one antenna may be received by other antennas. Examples of such cross-talk are illustrated in FIG. 12, which is similar to FIG. 10, except for a two-antenna system. Principles discussed with respect to FIG. 12 apply, however, to antenna systems having more than two antennas.

FIG. 12 illustrates a system having two antennas 1200 and 1202. The first antenna 1200 is coupled to a first RF receiver 1204, and the second antenna 1202 is coupled to a second RF receiver 1206. Cross-talk introduced into the signal path leading toward the first RF receiver 1204 is modeled by two lumps 1208 and 1210. The first error term 1208 $E_{11}(f)$ represents self-interference caused by the RF transmitter (not shown) that drives the first antenna 1200. The second error term 1210 $E_{22}(f)$ represents self-interference caused by the RF transmitter (not shown) that drives the second antenna 1202. Similar error terms 1212 and 1214 represent cross-talk introduced into the signal path leading toward the second RF receiver 1206.

As described with respect to FIG. 10, correction terms are generated. A first correction term 1216 $C_{11}(f)$ is used to cancel cross-talk from the RF transmitter coupled to the first antenna 1200, i.e., cross-talk represented by the first error term 1208, and a second correction term 1218 $C_{12}(f)$ is used to cancel cross-talk from the RF transmitter coupled to the second antenna 1202, i.e., cross-talk represented by the second error term 1210. Similar correction terms 1220 and 1222 are generated by the circuit coupled to the second antenna 1202.

As can be seen, each circuit coupled to an antenna 1200 and 1202 provides information, about the signal that circuit's RF transmitter sends, to each circuit coupled to another antenna. This information may be referred to as "backplane" information distributed among the circuits coupled to the antennas.

Error terms 1224 $E_1(f, \Theta, \varphi)$ and 1226 $E_2(f, \Theta, \varphi)$ represent unwanted signals, or impairments of signals, from the antennas 1200 and 1202, respectively, or their feedlines, but that are not attributable to any particular RF transmitter. A third correction term 1228 $C_1(f)$ is used to offset the error term 1224 $E_1(f, \Theta, \varphi)$, and a fourth correction term 1230 $C_2(f)$ is used to offset the error term 1226 $E_2(f, \Theta, \varphi)$. Constants 1232 $K_1(f)$ and 1234 $K_2(f)$ provide overall unity gain. Multiplexers 1236 and 1238 are parts of the respective transmitters.

Methods

Figure 13:
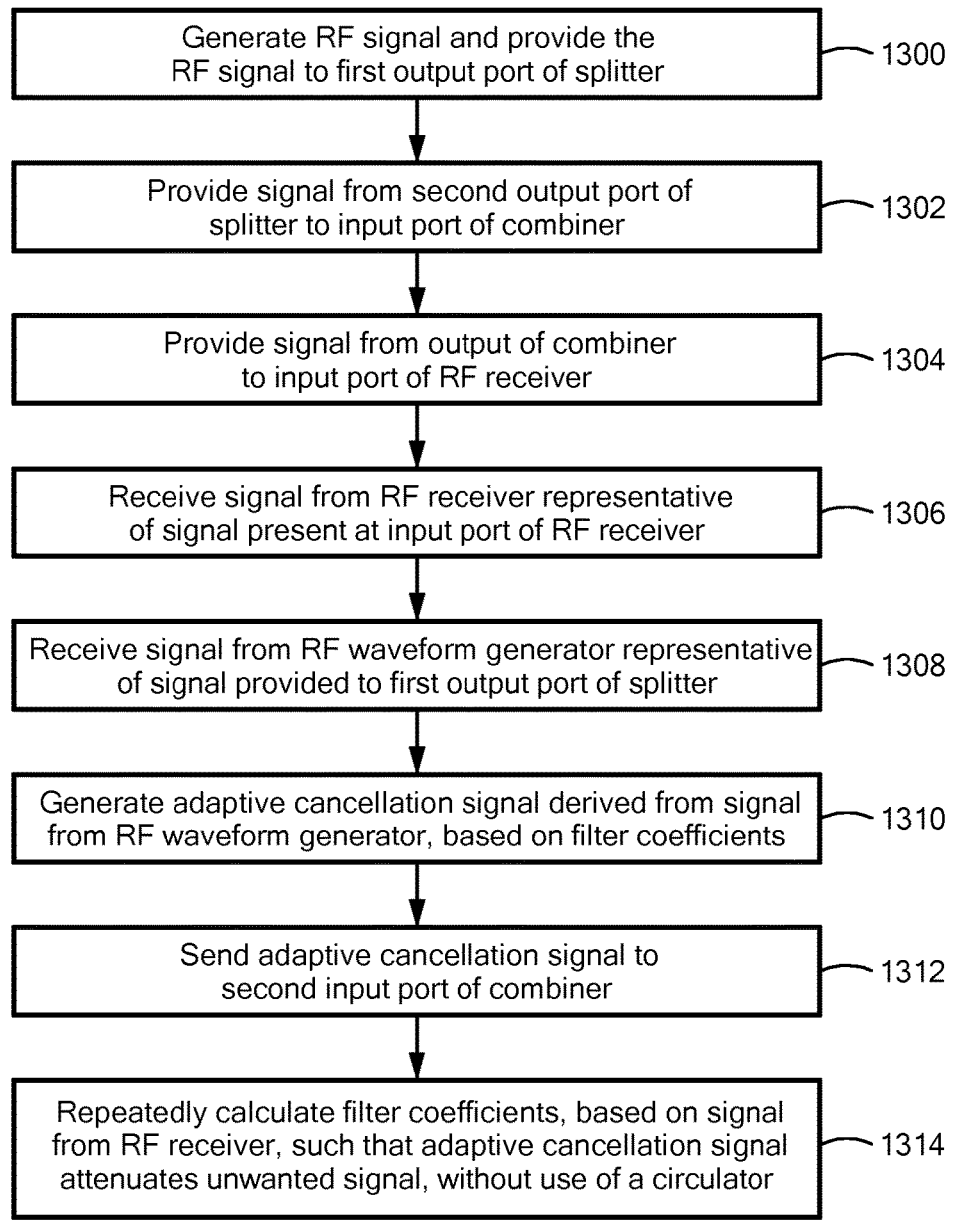
FIG. 13 is a flowchart illustrating operations performed by a method for adaptively, simultaneously transmitting and receiving radio-frequency (RF) communications, according to an embodiment of the present invention.

FIG. 13 is a flowchart illustrating operations performed by a method for adaptively, simultaneously transmitting and receiving radio-frequency (RF) communications. At 1300, an RF signal is generated by an RF waveform generator. The RF signal is provided to a first output port of a splitter. At 1302, a signal from a second output port of the RF signal splitter is provided to a first input port of an RF signal combiner. At 1304, a signal from an output port of the RF signal combiner is provided to an input port of an RF receiver.

At 1306, a signal from the RF receiver is received at an adaptive cancellation RF waveform generator. The signal is representative of a signal present at the input port of the RF receiver.

At 1308, a signal from the RF waveform generator is received at the adaptive cancellation RF waveform generator. The signal is representative of the RF signal provided to the first output port of the RF signal splitter.

At 1310, an adaptive cancellation signal is generated. The generated signal is derived from the signal from the RF waveform generator. The generated signal is based on filter coefficients. At 1312, the adaptive cancellation signal is sent to a second input port of the RF signal combiner. At 1314, the filter coefficients are repeatedly calculated by the adaptive cancellation RF waveform generator. The filter coefficients are calculated based on the signal from the RF receiver, such that the adaptive cancellation signal attenuates an unwanted signal, without use of a circulator.

Figure 14A:
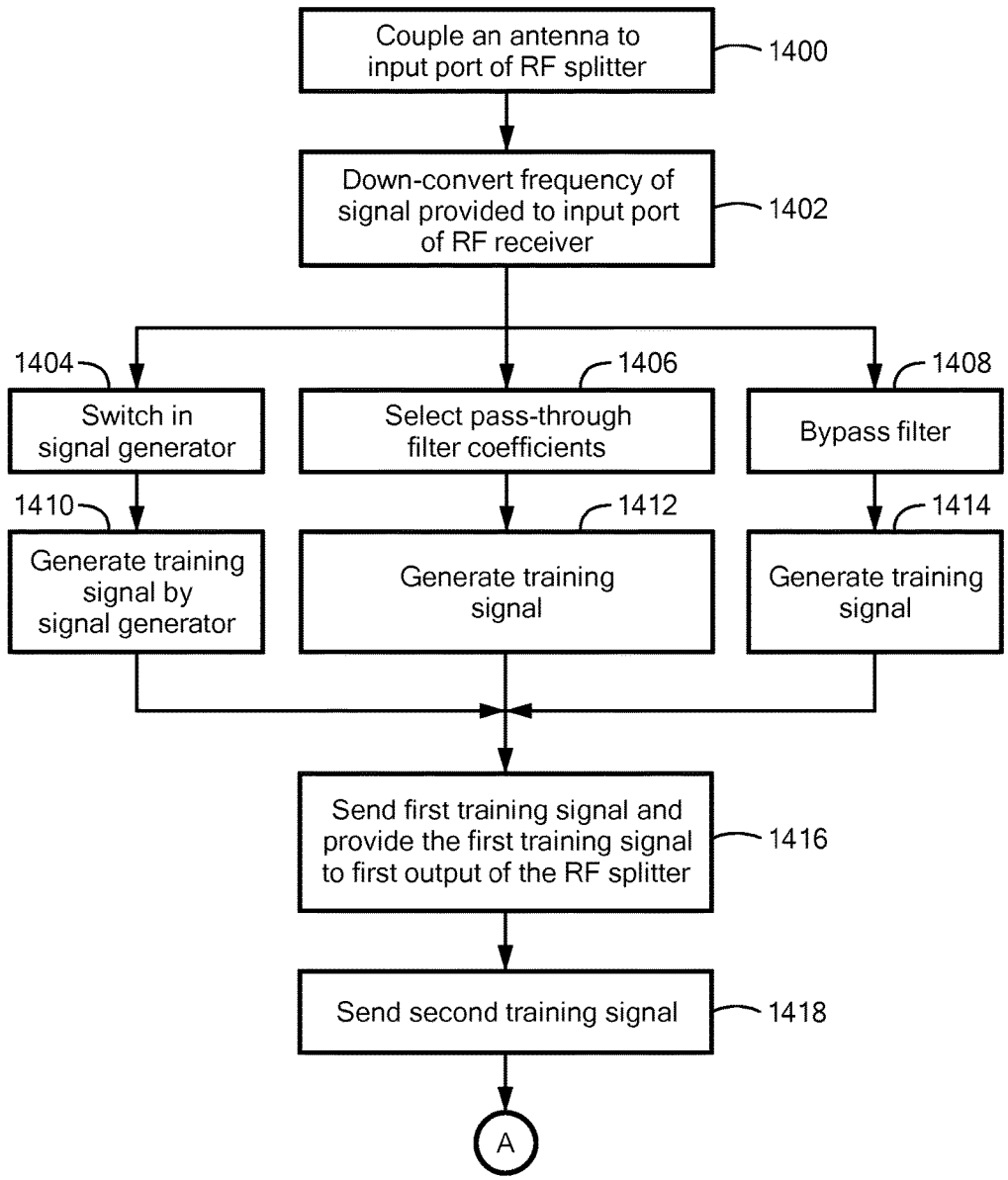
FIGS. 14A and 14B collectively contain a flowchart illustrating optional operations performed by some embodiments of the present invention.
Figure 14B:
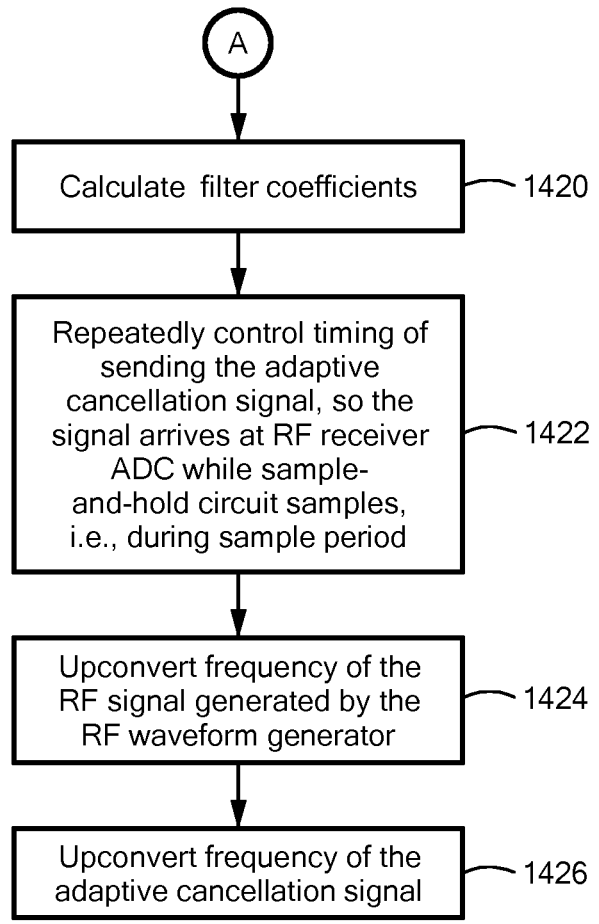

FIGS. 14A and 14B collectively contain a flowchart that illustrates optional operations, some or all of which may be performed by some embodiments of the present invention. At 1400, an antenna 108 may be coupled to the RF splitter 106. At 1402, the frequency of the signal provided to the RF receiver 104 may be down-converted.

As noted, the training signal can be generated in various ways. For example, at 1404, a separate signal generator 168 may be switched in, and at 1410, the training signal may be generated by the separate signal generator 168. At 1406, pass-through filter coefficients may be selected for the FIR filter 152, and at 1412, the training signal may be generated. Or, at 1408, the FIR filter 152 may be bypassed, and at 1414, the training signal may be generated.

At 1416, the first training signal may be sent and provided to the first output 114 of the RF splitter 106. At 1418, the second training signal may be generated.

At 1420, filter coefficients may be calculated by the adaptive coefficient calculator 154. At 1422, timing of sending the adaptive cancellation signal may be repeatedly controlled, so the signal arrives at the ADC/sample-and-hold 138/140 of the RF receiver 104 while the sample-and-hold 140 circuit samples, i.e., during a sample period.

At 1424, the frequency of the RF signal generated by the RF waveform generator 142 may be up-converted, and at 1426, the frequency of the adaptive cancellation signal may be up-converted.

As used herein, the term "antenna element" means a portion of a single antenna, such as a driven element, reflector or the like. A phased array includes a plurality of antennas.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, digital circuits, analog circuits, digital signal processors (DSPs), application specific integrated circuits (ASICs), field-programmable gate arrays (FPGAs) or other hardware), firmware or combinations thereof.

Embodiments may be implemented by a processor executing, or controlled by, instructions stored in a memory. The processor may be a general purpose central processing unit (CPU), digital signal processor (DSP) or other special purpose processor. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

What is claimed is:

1. An adaptive, simultaneous transmit and receive (STAR) radiofrequency (RF) communication system comprising:
    an RF signal splitter comprising an input port, a first output port and a second output port, the input port being coupleable to an antenna;
    an RF waveform generator comprising an output port coupled to the first output port of the RF signal splitter;
    an RF signal combiner comprising a first input port, a second input port and an output port, the first input port being coupled to the second output port of the RF signal splitter;
    an RF receiver comprising an input port and an output port, the input port of the RF receiver being coupled to the output port of the RF signal combiner and the output port of the RF receiver providing a signal representative of a signal present at the input port of the RF receiver; and
    an adaptive cancellation RF waveform generator comprising a filter, an adaptive filter coefficient calculator, a first signal input port, a second signal input port and a signal output port, the adaptive filter coefficient calculator being coupled to the first signal input port of the adaptive cancellation RF waveform generator, wherein:
    the signal output port of the adaptive cancellation RF waveform generator is coupled to the second input port of the RF signal combiner;
    the first signal input port of the adaptive cancellation RF waveform generator is coupled to the output port of the RF receiver to receive the signal representative of the signal present at the input port of the RF receiver;
    the second signal input port of the adaptive cancellation RF waveform generator is coupled to the RF waveform generator to receive a signal from the RF waveform generator representative of a signal the RF waveform generator sends via the output port of the RF waveform generator;
    the filter is coupled between the second signal input port of the adaptive cancellation RF waveform generator and the signal output port of the adaptive cancellation RF waveform generator to generate, based on filter coefficients provided by the adaptive filter coefficient calculator, an adaptive cancellation signal derived from the signal from the RF waveform generator and send the adaptive cancellation signal via the signal output port of the adaptive cancellation RF waveform generator; and the adaptive cancellation RF waveform generator repeatedly calculates the filter coefficients, based on the signal from the RF receiver, received by the adaptive cancellation RF waveform generator via the first signal input port of the adaptive cancellation RF waveform generator, from the output port of the RF receiver, such that the adaptive cancellation signal attenuates an unwanted signal, without use of a circulator.

2. A system according to claim 1, wherein:

the RF waveform generator sends a first training signal, via the output port of the RF waveform generator, while the adaptive cancellation RF waveform generator sends no signal via the signal output port of the adaptive cancellation RF waveform generator;

the adaptive cancellation RF waveform generator stores information about the signal from the RF receiver as a result of the RF receiver receiving the first training signal;

the adaptive cancellation RF waveform generator sends a second training signal, substantially identical to the first training signal, via the signal output port of the adaptive cancellation RF waveform generator, while the RF waveform generator sends no signal via the output port of the RF waveform generator; and the adaptive cancellation RF waveform generator calculates at least some of the filter coefficients based on the stored information and the signal from the RF receiver as a result of the RF receiver receiving the second training signal.

3. A system according to claim 2, further comprising a training signal generator, distinct from the filter, coupled via a switch to the signal output port of the adaptive cancellation RF waveform generator.

4. A system according to claim 2, wherein the adaptive cancellation RF waveform generator uses pass-through filter coefficients to generate the second training signal from a signal from the RF waveform generator.

5. A system according to claim 2, further comprising a switch coupled to the filter to selectively bypass the filter to generate the second training signal.

6. A system according to claim 1, wherein:

the RF receiver comprises an analog-to-digital converter (ADC), the ADC comprising a sample-and-hold circuit coupled to the input port of the RF receiver to sample a signal present at the input port of the RF receiver; and the adaptive cancellation RF waveform generator repeatedly controls timing of sending the adaptive cancellation signal via the signal output port of the adaptive cancellation RF waveform generator, such that the adaptive cancellation signal arrives at the ADC while the sample-and-hold circuit samples the signal present at the input port of the RF receiver.

7. A system according to claim 1, wherein:

the RF waveform generator comprises a digital waveform generator coupled to a first digital-to-analog converter (DAC); and the adaptive cancellation RF waveform generator comprises a second DAC coupled between the filter and the signal output port of the adaptive cancellation RF waveform generator.

8. A system according to claim 1, further comprising an antenna coupled to the input port of the RF signal splitter.

9. A system according to claim 1, further comprising: a local oscillator; a first frequency up-converter driven by the local oscillator and coupled between the output port of the RF waveform generator and the first output port of the RF signal splitter;

a second frequency up-converter driven by the local oscillator and coupled between the signal output port of the adaptive cancellation RF waveform generator and the second input port of the RF signal combiner; and a frequency down-converter driven by the local oscillator and coupled between the output port of the RF signal combiner and the input port of the RF receiver.

10. A method for adaptively, simultaneously transmitting and receiving radio-frequency (RF) communications, the method comprising:

generating an RF signal by an RF waveform generator and providing the RF signal to a first output port of an RF signal splitter;

providing a signal from a second output port of the RF signal splitter to a first input port of an RF signal combiner;

providing a signal from an output port of the RF signal combiner to an input port of an RF receiver;

receiving, at a first input port of an adaptive cancellation RF waveform generator, a signal from an output port of the RF receiver representative of a signal present at the input port of the RF receiver;

receiving, at a second input port of the adaptive cancellation RF waveform generator, a signal from the RF waveform generator representative of the RF signal provided to the first output port of the RF signal splitter;

generating, at the adaptive cancellation RF waveform generator, based on filter coefficients provided by an adaptive filter coefficient calculator, an adaptive cancellation signal derived from the signal from the RF waveform generator;

sending the adaptive cancellation signal, via an output port of the adaptive cancellation RF waveform generator, to a second input port of the RF signal combiner; and repeatedly calculating, by the adaptive cancellation RF waveform generator, the filter coefficients, based on the signal from the RF receiver, received by the adaptive cancellation RF waveform generator via the first input port of the adaptive cancellation RF waveform generator, from the output port of the RF receiver, such that the adaptive cancellation signal attenuates an unwanted signal, without use of a circulator.

11. A method according to claim 10, further comprising:

sending a first training signal, by the RF waveform generator, while the adaptive cancellation RF waveform generator sends no adaptive cancellation signal, and providing the first training signal to the first output port of the RF signal splitter;

storing, by the adaptive cancellation RF waveform generator, information about the signal from the RF receiver as a result of the RF receiver receiving the first training signal;

sending a second training signal, by the adaptive cancellation RF waveform generator, substantially identical to the first training signal, while the RF waveform generator provides no signal to the first output port of the RF signal splitter; and calculating at least some of the filter coefficients, based on the stored information and the signal from the RF receiver as a result of the RF receiver receiving the second training signal.

12. A method according to claim 10, further comprising:
generating a training signal by a signal generator, other than a filter in the adaptive cancellation RF waveform generator; and
sending the training signal to the second input port of the RF signal combiner via a switch.

13. A method according to claim 11, wherein sending the second training signal comprises using pass-through filter coefficients in the adaptive cancellation RF waveform generator to generate the second training signal.

14. A method according to claim 11, wherein sending the second training signal comprises selectively bypassing a filter in the adaptive cancellation RF waveform generator.

15. A method according to claim 10, wherein:
the RF receiver comprises an analog-to-digital converter (ADC), the ADC comprising a sample-and-hold circuit coupled to the input port of the RF receiver to sample a signal present at the input port of the RF receiver; the method further comprising:
repeatedly controlling timing of sending the adaptive cancellation signal, such that the adaptive cancellation signal arrives at the ADC while the sample-and-hold circuit samples the signal present at the input port of the RF receiver.

16. A method according to claim 10, further comprising coupling an antenna to the input port of the RF signal splitter.

17. A method according to claim 10, further comprising:
up-converting frequency of the RF signal generated by the RF waveform generator;
up-converting frequency of the adaptive cancellation signal; and
down-converting frequency of the signal provided to the input port of the RF receiver.

18. An adaptive, simultaneous transmit and receive (STAR) radiofrequency (RF) communication system comprising:
a plurality of self-interference cancellation circuits, each self-interference cancellation circuit being connectable to a distinct antenna associated with the self-interference cancellation circuit, each self-interference cancellation circuit comprising:
an RF signal splitter comprising an input port, a first output port and a second output port, the input port being coupleable to the antenna associated with the self-interference cancellation circuit;
an RF waveform generator comprising an output port coupled to the first output port of the RF signal splitter;
an RF signal combiner comprising a first input port, a second input port and an output port, the first input port being coupled to the second output port of the RF signal splitter;
an RF receiver comprising an input port and an output port, the input port of the RF receiver being coupled to the output port of the RF signal combiner and the output port of the RF receiver providing a signal representative of a signal present at the input port of the RF receiver; and
an adaptive cancellation RF waveform generator comprising a filter, an adaptive filter coefficient calculator, a first signal input port, a second signal input port for each self-interference cancellation circuit and a signal output port, the adaptive filter coefficient calculator being coupled to the first signal input port of the adaptive cancellation RF waveform generator, wherein:
the signal output port of the adaptive cancellation RF waveform generator is coupled to the second input port of the RF signal combiner;
the first signal input port of the adaptive cancellation RF waveform generator is coupled to the output port of the RF receiver to receive the signal representative of the signal present at the input port of the RF receiver;
each second signal input port of the adaptive cancellation RF waveform generator is coupled to the RF waveform generator in each respective self-interference cancellation circuit to receive a signal from the RF waveform generator representative of a respective signal the RF waveform generator sends via its respective output port;
the filter is coupled between the second signal input ports of the adaptive cancellation RF waveform generator and the signal output port of the adaptive cancellation RF waveform generator to generate, based on filter coefficients provided by the adaptive filter coefficient calculator, an adaptive cancellation signal derived from the signals from the RF waveform generators and send the adaptive cancellation signal via the signal output port of the adaptive cancellation RF waveform generator; and
the adaptive cancellation RF waveform generator repeatedly calculates the filter coefficients, based on the signal from the RF receiver, received by the adaptive cancellation RF waveform generator via the first signal input port of the adaptive cancellation RF waveform generator, from the output port of the RF receiver, such that the adaptive cancellation signal attenuates an unwanted signal, without use of a circulator, and the adaptive cancellation RF waveform generator sends information about the filter coefficients to the other adaptive cancellation RF waveform generators for use in their respective filter coefficient calculations.

19. A computer program product for providing an adaptive, simultaneous transmit and receive (STAR) radio-frequency (RF) communication system, the computer program product comprising a non-transitory computer-readable medium having computer readable program code stored thereon, the computer readable program code configured to:
generate an RF signal by an RF waveform generator, the RF signal to be provided to a first output port of an RF signal splitter, a signal to be provided from a second output port of the RF signal splitter to a first input port of an RF signal combiner, a signal from an output port of the RF signal combiner to be provided to an input port of an RF receiver;
receive an RF signal at the RF receiver;
receive, at a first input port of an adaptive cancellation RF waveform generator, a signal from an output port of the RF receiver representative of a signal present at the input port of the RF receiver;
receive, at a second input port of the adaptive cancellation RF waveform generator, a signal from the RF waveform generator representative of the RF signal provided to the first output port of the RF signal splitter;
generate, at the adaptive cancellation RF waveform generator, based on filter coefficients provided by the adaptive filter coefficient calculator, an adaptive cancellation signal derived from the signal from the RF waveform generator;
send the adaptive cancellation signal, via a signal output port of the adaptive cancellation RF waveform generator, to a second input port of the RF signal combiner; and repeatedly calculate, by the adaptive cancellation RF waveform generator, the filter coefficients, based on the signal from the RF receiver, received by the adaptive cancellation RF waveform generator via the first input port of the adaptive cancellation RF waveform generator, from the output port of the RF receiver, such that the adaptive cancellation signal attenuates an unwanted signal, without use of a circulator.

* * * * *